United States Patent
Kusumoto et al.

(10) Patent No.: US 8,947,751 B2
(45) Date of Patent: Feb. 3, 2015

(54) IMAGE READING DEVICE AND IMAGE FORMING APPARATUS

(71) Applicants: Hiroshi Kusumoto, Tokyo (JP); Tatsuaki Nagano, Kanagawa (JP); Yohei Osanai, Kanagawa (JP); Satoshi Narai, Tokyo (JP); Masafumi Kishi, Kanagawa (JP); Toshiyuki Horikawa, Kanagawa (JP)

(72) Inventors: Hiroshi Kusumoto, Tokyo (JP); Tatsuaki Nagano, Kanagawa (JP); Yohei Osanai, Kanagawa (JP); Satoshi Narai, Tokyo (JP); Masafumi Kishi, Kanagawa (JP); Toshiyuki Horikawa, Kanagawa (JP)

(73) Assignee: Ricoh, Company Ltd., Tokyo (JP)

( * ) Notice: Subject to any disclaimer, the term of this patent is extended or adjusted under 35 U.S.C. 154(b) by 0 days.

(21) Appl. No.: 14/156,886

(22) Filed: Jan. 16, 2014

(65) Prior Publication Data

US 2014/0211279 A1 Jul. 31, 2014

(30) Foreign Application Priority Data

Jan. 25, 2013 (JP) ................................. 2013-012572

(51) Int. Cl.
*H04N 1/04* (2006.01)
*H04N 1/00* (2006.01)

(52) U.S. Cl.
CPC .................................. *H04N 1/00559* (2013.01)
USPC ............. 358/497; 358/474; 358/486; 358/494

(58) Field of Classification Search
USPC ......... 358/497, 474, 486, 471, 509, 487, 494, 358/496, 482, 505, 506, 475, 483, 514, 512, 358/513, 210, 212, 205, 17, 19, 196.1, 358/198.2, 201.1, 202.1, 204.4, 210.1, 358/212.1, 219.2, 221.2, 223.1, 227, 232, 358/578, 583, 584, 642, 641, 8, 38; 382/312, 318, 319

See application file for complete search history.

(56) References Cited

U.S. PATENT DOCUMENTS

2003/0039486 A1* 2/2003 Bannai et al. ................. 399/211

FOREIGN PATENT DOCUMENTS

JP 2001-045199 2/2001
JP 2009-288584 12/2009

OTHER PUBLICATIONS

Yasuo, Image Reader, Feb. 16, 2001, Machine Translated Japanese Patent Publication, JP2001045199, all pages.*

(Continued)

*Primary Examiner* — Ngon Nguyen
(74) *Attorney, Agent, or Firm* — Harness, Dickey & Pierce P.L.C.

(57) ABSTRACT

An image reading device, which can be included in an image forming apparatus, includes an image pickup device, a transparent member, a traveling body, and a housing. The traveling body includes a light source to emit light and guides the light reflected from a surface of the document to the image pickup device while moving in a sub scanning direction along the document surface on the transparent member. The housing accommodates the image pickup device and the traveling body, and includes a base member including a rectangular bottom surface and a side surface, and a rail member including a rail surface and a first vertical surface. The rail member further includes a fixing part that is a surface to be fixed to the bottom surface of the base member and to extend from one end of the rail member in the sub scanning direction to the other end.

10 Claims, 19 Drawing Sheets

(56) References Cited

OTHER PUBLICATIONS

Yasuo, Image Reader, Apr. 23, 1999, Machine Translated Japanese Patent Publication, JP11112700, all pages.*

Yasuo, Image Reader and Image Forming Device Having Image Reader, Sep. 26, 2001, Machine Translated Japanese Patent Publication, JP2001264897, all pages.*

* cited by examiner

IMAGE READING DEVICE AND IMAGE FORMING APPARATUS

CROSS-REFERENCE TO RELATED APPLICATIONS

This patent application is based on and claims priority pursuant to 35 U.S.C. §119 to Japanese Patent Application No. 2013-012572, filed on Jan. 25, 2013 in the Japan Patent Office, the entire disclosure of which is hereby incorporated by reference herein.

BACKGROUND

1. Technical Field

Embodiments of the present invention relate to an image reading device and an image forming apparatus.

2. Related Art

Known image forming apparatuses include an image reading device that guides light of a light source, which is reflected from a document surface of a document on a contact glass, to an image pickup device, to read an image, while moving a traveling body, which includes at least the light source, in a sub scanning direction along the document surface of the document on the contact glass.

The traveling body moves along rails provided in a housing that houses the traveling body, the image pickup device, and the like, so that the document is scanned.

In such an image reading device, in a case in which the rigidity of the housing is low, when the image reading device is carried for the placement of the image reading device, the housing may be twisted or bent. Additionally, when the image reading device is detached from the image forming apparatus to be carried outside the apparatus for maintenance of the image reading device, or the like, the housing may be twisted or bent.

Japanese Patent Application Publication No. JP 2001-045199-A (Japanese Patent No. 3781252-B) describes an image reading device, in which a housing is reinforced by rail members having rails on which a traveling body travels.

FIGS. 1 and 2 are cross-sectional views illustrating an image reading device 200 described in JP 2001-045199-A.

The image reading device 200 described in JP 2001-045199-A has a housing 207 that is formed with an opening 206 on an upper end surface, and a traveling body 208 that is housed reciprocally in a direction orthogonal to a paper surface in the housing 207. Additionally, the image reading device 200 has a contact glass 209 that is mounted on the housing 207 and covers the opening 206.

The housing 207 has a rectangular bottom surface 210, side surfaces 211 that rise from the four sides of this bottom surface 210, and a box-shaped base member 213 with an open upper end, in which the bottom surface 210 and each of the side surfaces 211 form an L-shaped member 212. Additionally, the housing 207 includes a pair of rail members 214 that have rail surfaces for allowing the traveling body 208 to travel. One of the rail members 214 is fixed to one end in a main scanning direction of the base member 213, and the other of the rail members 214 is fixed to the other end in the main scanning direction of the base member 213, the main scanning direction being a left and right direction in the figure.

Each of the rail members 214 has a part that has a first vertical surface 215, a second vertical surface 216, and a first horizontal surface 217 connecting respective one ends of these vertical surfaces 215 and 216, and is bent in a crank shape. Additionally, the rail member 214 has a second horizontal surface 218 that is formed on the other end side of the second vertical surface 216 and bent so as to vertically face the first horizontal surface 217 in parallel. The first vertical surface 215 and the first horizontal surface 217 form an L-shaped member 219. The first horizontal surface 217 of each rail member 214 is the rail surface of the traveling body 208, and the second horizontal surface 218 is a placing surface of the contact glass 209.

In the image reading device described in JP 2001-045199-A, the rail members 214 are fixed to the base member 213 in the following manner.

FIG. 2 is a diagram for illustrating the fixing of one of the rail members 214. As shown in FIG. 2, a projecting fixing part 220 formed on the lower edge of the first vertical surface 215 of the rail member 214 is inserted into a hole 221 formed on the bottom surface 210. Then, the fixing part 220 that projects outside the housing from the hole 221 of the bottom surface 210 is bent, and the bent part is welded, so that the rail member 214 is fixed to the bottom surface 210 of the base member 213. Furthermore, the second vertical surface 216 and the side surfaces 211 are overlapped, and the overlapped portion is fixed by welding, screws, or the like. Consequently, the rail member 214 is fixed also to the side surface 211 of the base member 213.

Thus, the respective rail members 214 are fixed to the base member 213, so that the L-shaped members 212 on the both ends of the base member 213, and the L-shaped members 219 of the rail members 214 form square pipe-shaped members 222 on the both ends of the housing 207, as shown in FIG. 1. The rigidity of the housing 207 is enhanced by the square pipe-shaped members 222. Therefore, when the image reading device is carried, twist or bending is unlikely to occur. As a result, the deterioration of image reading performance, which is caused by the aforementioned twist or bending of the housing 207 is prevented.

SUMMARY

At least one embodiment of the present invention provides an image reading device including an image pickup device, a plate-like transparent member, a traveling body, and a housing. The plate-like transparent member places a document thereon. The traveling body includes a light source to emit light and guides the light reflected from a surface of the document on the transparent member to the image pickup device while moving in a sub scanning direction along the document surface on the transparent member. The housing accommodates the image pickup device and the traveling body therein. The housing includes a base member and a rail member. The base member includes a rectangular bottom surface and a side surface vertically rising from the bottom surface and having an L-shaped member formed by the bottom surface and the side surface. The rail member includes a rail surface parallel to the bottom surface on which at least the traveling body travels and a first vertical surface vertically falling from a side of one end of the rail surface and having an L-shaped member formed by the rail surface and the first vertical surface. The rail member is fixed to the side surface of the base member and the bottom surface of the base member to form a square pipe shape by the L-shaped member of the base member and the L-shaped member of the rail member. The rail member further includes a fixing part to be fixed to the bottom surface of the base member. The fixing part is a surface formed by being vertically bent from the first vertical surface and extending from one end of the rail member in the sub scanning direction to the other end.

Further, at least one embodiment of the present invention provides an image forming apparatus including the above-described image reading device and an image forming member. The image forming member forms an image on a recording medium on the basis of image information read by the image reading device.

BRIEF DESCRIPTION OF THE DRAWINGS

A more complete appreciation of the invention and many of the advantages thereof will be obtained as the same becomes better understood by reference to the following detailed description when considered in connection with the accompanying drawings, wherein.

DETAILED DESCRIPTION

Figure 1:
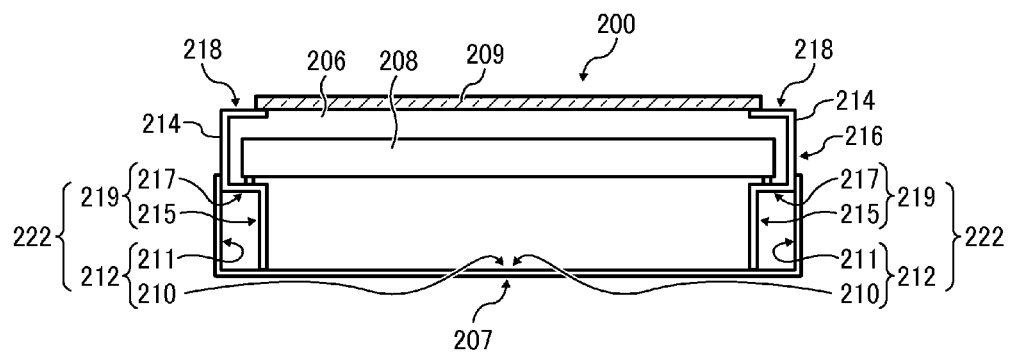
FIG. 1 is a sectional view showing a conventional image reading device.
Figure 2:
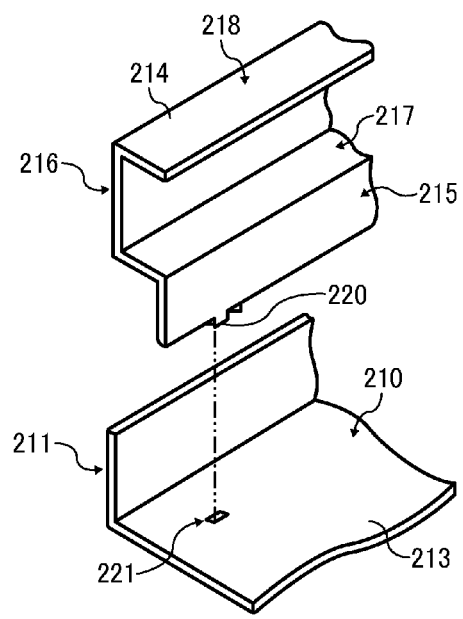
FIG. 2 is a diagram for illustrating the fixing of a rail member in the conventional image reading device.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

The terminology used herein is for describing particular embodiments and is not intended to be limiting of exemplary embodiments of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of the present invention. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of the present invention.

The present invention is applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of the present invention are described.

Hereinafter, an electrographic copying machine (hereinafter simply referred to as a copying machine 11) will be described as an example of an embodiment (hereinafter, this embodiment is referred to as a first embodiment) of an image forming apparatus, to which the present invention is applied.

Figure 3:
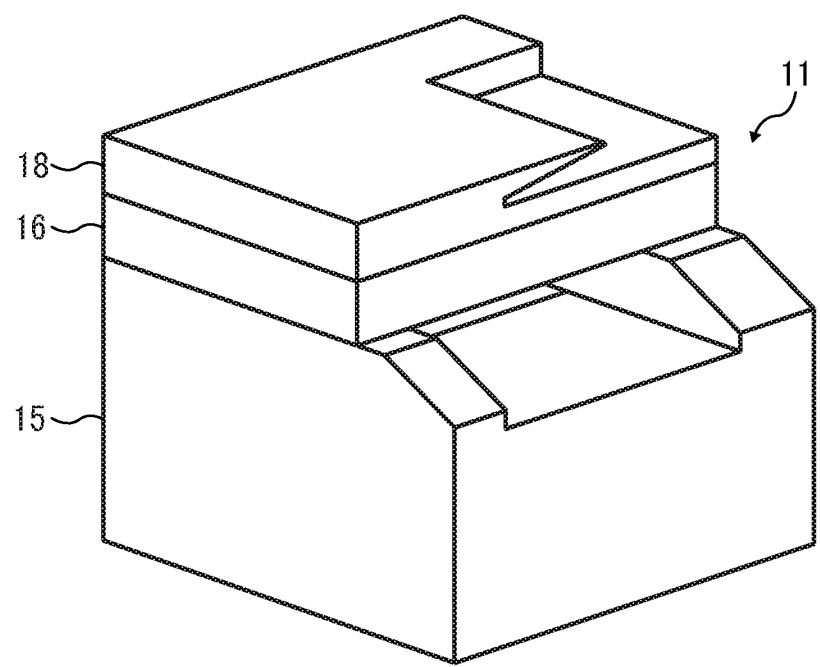
FIG. 3 is an external perspective view of the whole of a copying machine as an image forming apparatus according to an embodiment.

FIG. 3 is an external perspective view of the whole of the copying machine 11 as an image forming apparatus according to the embodiment.

In the copying machine 11, a scanner 16 that serves as an image reading device is arranged on the upper part of an apparatus body 15 that houses an image forming unit 12, a fixing device 13, a recording medium conveyance unit 14, and the like. On the upper part of the scanner 16, an automatic document feeder (ADF) 18 that serves as a document feeder is provided.

Figure 4:
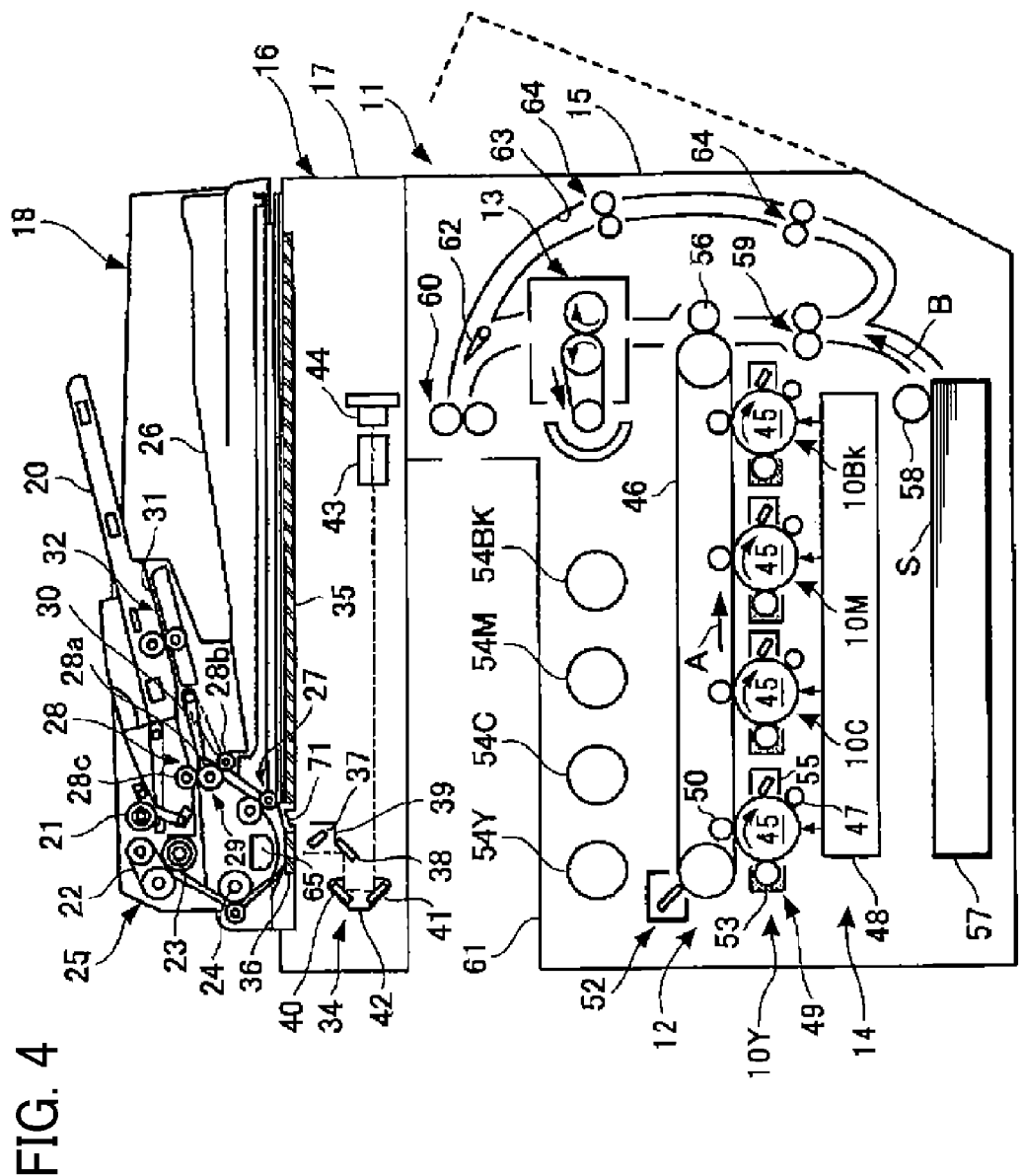
FIG. 4 is a schematic configuration diagram of the copying machine.

FIG. 4 is a schematic configuration diagram of the copying machine 11.

In FIG. 4, the copying machine 11 that serves as an image forming apparatus includes the image forming unit 12 that forms a toner image on a recording medium, and the fixing device 13 that fixes the toner image on the recording medium, which is formed by the image forming unit 12, on the recording medium. Additionally, the copying machine 11 includes the recording medium conveyance unit 14 that feeds a recording medium to the image forming unit 12.

The image forming unit 12, the fixing device 13, and the recording medium conveyance unit 14 are housed in the apparatus body 15. On the upper part of the image forming unit 12, the scanner 16 that reads an document image, and the automatic document feeder (hereinafter, simply referred to as an ADF) 18 that has a function of a pressure plate as an opening/closing body that conveys a document are arranged. The ADF 18 is openably/closably mounted on a housing 17 of the scanner 16 via a hinge mechanism.

The ADF 18 includes the document placing table 20 on which a document bundle can be placed, and a pickup roller 21 that moves between a contact position, at which the pickup roller 21 sends out the document bundle in contact with the upper surface of the document bundle placed on the document placing table 20, and a separation position, at which the pickup roller 21 is separated from the document bundle. Additionally, the ADF 18 includes a document feeder 25 that includes a paper feed belt 22, a reverse roller 23, and a pair of conveyance rollers 24, and separates documents one by one from the document bundle sent out by the pickup roller 21, to convey the separated documents toward a slit glass 36 at a reading position. Furthermore, the ADF 18 includes a document discharger 29 that includes a pair of conveyance rollers 27 and a pair of paper discharge rollers 28, and discharge documents, which are completed to be read at the reading position, to a document discharge table 26.

The pair of paper discharge rollers 28 include drive rollers 28a, and driven rollers 28b and driven rollers 28c that are in sliding contact with the drive rollers 28a, and switching claws 30 are provided in the vicinity of the pair of paper discharge rollers 28. The switching claws 30 move between a first switching position and a second switching position. When the switching claws 30 are switched to the first switching position, a document is discharged to the document discharge table 26 by the drive rollers 28a and the driven rollers 28b. When the switching claws 30 are switched to the second switching position, a document is conveyed to a switchback path 31 by the drive rollers 28a and the driven rollers 28c.

The switchback path 31 is provided with a pair of switchback rollers 32 rotatable in forward and reverse directions. The document conveyed to the switchback path 31 is conveyed to the right in FIG. 1 by the pair of switchback rollers 32, and thereafter the pair of switchback rollers 32 are driven to rotate in the reverse direction. Consequently, the document is conveyed to the pair of conveyance rollers 24 via a re-conveyance path. Therefore, the document is reversed to be conveyed to the reading position.

As is well know itself, the scanner 16 includes the housing 17 that houses an optical system 34, and a contact glass 35 and the slit glass 36 that are fixedly arranged on the upper part of the housing 17. By placing documents such as bound documents and a book on the contact glass 35 to press the documents P by the ADF 18, the scanner 16 can read the documents. The documents automatically conveyed by the ADF 18 are read at the reading position of the slit glass 36. The optical system 34 of the scanner 16 includes a first traveling body 39 that has a light source 37 and a first mirror 38, and a second traveling body 42 that has a second mirror 40 and a third mirror 41. Additionally, the optical system 34 includes an imaging lens 43, and a CCD image sensor 44.

The first traveling body 39 and the second traveling body 42 move to the right from a position shown in FIG. 3. At this time, the document is illuminated by light emitted from the light source 37. The reflected light is reflected on the first mirror 38, the second mirror 40, and the third mirror 41 in this order, and thereafter enters the CCD image sensor 44 through the imaging lens 43. Thus, a document image is formed by the CCD image sensor 44, so that an image of the document is read.

In a case of reading a document, the ADF 18 reads the document that travels in the aforementioned steps in a state where the first traveling body 39 and the second traveling body 42 are fixed at a position shown in the right in FIG. 3.

A reflection guide plate 65 is provided on the slit glass 36, configures a white reference at the time of the reading of a document, and reflects light from the light source 37. Additionally, a guide member 71 is provided between the contact glass 35 and the slit glass 36, and scoops up a document that passes the slit glass 36, to guide the document toward the pair of conveyance rollers 27.

The image forming unit 12 includes process cartridges 10Y, 10M, 10C, and 10K that serve as process units. On these process cartridges 10Y, 10M, 10C, and 10K, an intermediate transfer belt 46 configured from an endless belt wound around a plurality of support rollers is arranged to be opposed.

The subscripts of Y, M, C, K of the four process cartridges 10, which are attached after the reference numerals, indicate specifications for yellow, magenta, cyan, and black. The four process cartridges 10Y, 10M, 10C, and 10K have substantially the same configuration except that the colors of toner to be used are different, and therefore the subscripts of Y, M, C, K are omitted in the following description.

Each of the process cartridges 10 has a unit-like structure by integrally supporting a photoconductor 45 that is a latent image carrier, an electrostatic charging member 47 that is a charging unit, a developing apparatus 49 that is a developing unit, and a photoconductor cleaning apparatus that is a cleaner. Each process cartridge 10 can be detachable from the apparatus body 15 by releasing a stopper.

Each photoconductor 45 rotates in the clockwise direction in the drawing, as shown by the arrow in the drawing. Each electrostatic charging member 47 is a roller-shaped charging roller, and is in pressure contact with the surface of the photoconductor 45 to be rotated following the rotation of the photoconductor 45. At the time of forming an image, predetermined bias is applied to the electrostatic charging member 47 by a high pressure power supply to electrify the surface of the photoconductor 45. In the process cartridge 10, the roller-shaped electrostatic charging member 47 that contacts the surface of the photoconductor 45 is used as a charging unit. However, the charging unit is not limited to this, and a non-contact electrification system such as corona charge may be used.

An exposure apparatus 48 exposes the surfaces of the photoconductors 45 to light to form electrostatic latent images on the surfaces of the photoconductors 45 on the basis of the image information of the document image read by the scanner 16, or image information input from an external apparatus such as a personal computer. The exposure apparatus 48 that the image forming unit 12 includes employs laser beam scanning system using a laser diode, but may employ other configuration, for example a configuration using an LED array, as an exposer.

The developing apparatus 49 has developer containers 53 that contain powder toner, and the electrostatic latent images are visualized by the toner. The photoconductor cleaning apparatuses 55 clean transfer residual toner that remains on the surfaces of the photoconductors 45 which pass positions opposed to the intermediate transfer belt. The photoconductor cleaning apparatuses 55 each include a cleaning container that receives the toner removed from the photoconductor 45. The toner in each cleaning container is conveyed to a waste toner container by a toner conveyance apparatus.

Toner bottles 54Y, 54M, 54C, and 54K are disposed above the image forming unit 12. The toner bottles 54Y, 54M, 54C, and 54K contain yellow, magenta, cyan, and black toner powder to be supplied to the respective developer containers 53.

The four process cartridges 10Y, 10M, 10C, and 10K form yellow, magenta, cyan, and black color toner images on the respective photoconductors 45. The four process cartridges 10 are arranged in parallel in a direction in which the surface of the intermediate transfer belt 46 moves, sequentially transfer the toner images formed on the respective photoconductor 45 to the intermediate transfer belt 46 such that the toner images are overlapped, and form a visual image on the intermediate transfer belt 46.

In FIG. 4, primary transfer rollers 50 as primary transfer unit are arranged at such positions that the primary transfer rollers 50 and the corresponding photoconductors 45 are opposed with the intermediate transfer belt 46 therebetween. Primary transfer bias is applied to the primary transfer rollers 50 by the high pressure power supply, and primary transfer fields are formed between the photoconductors 45 and the primary transfer rollers 50. The primary transfer fields are formed between the photoconductors 45 and the primary transfer rollers 50, so that toner images formed on the surfaces of the photoconductors 45 are transferred to the surface of the intermediate transfer belt 46. One of a plurality of stretching rollers that stretch the intermediate transfer belt 46 is rotated by a driving motor, so that the intermediate transfer belt 46 performs surface movement along the arrow A in FIG. 4. The respective color toner images are sequentially overlapped to be transferred on the surface of the intermediate transfer belt 46 that performs the surface movement, so that a full color image is formed on the surface of the intermediate transfer belt 46.

Thus, the overlapped toner images that are transferred onto the intermediate transfer belt 46 is secondarily transferred to a recording medium by the action of a secondary transfer roller 56. The transfer residual toner, which is stuck onto the intermediate transfer belt 46 after the transfer, is removed from a belt cleaning apparatus 52. A cleaning container of this cleaning apparatus 52 also houses toner, and the toner is conveyed to a waste toner container.

The recording medium conveyance unit 14 is arranged below the four process cartridges 10. This recording medium conveyance unit 14 has a paper feeding cassette 57 that houses a recording medium S such as transfer paper and a resin sheet. Additionally, the recording medium conveyance unit 14 has a paper feeding roller 58 that is in contact with the uppermost recording medium S of a recording medium bundle housed in this paper feeding cassette, and a pair of resist rollers 59. The uppermost recording medium S is sent out along the arrow B in FIG. 1 by the rotation of the paper feeding roller 58. The recording medium S that is sent out is fed between the intermediate transfer belt 46 and the secondary transfer roller 56 arranged to be opposed to the intermediate transfer belt 46, at a predetermined timing by the rotation of the pair of resist rollers 59.

When this recording medium S passes between the intermediate transfer belt 46 and the secondary transfer roller 56, a transfer voltage is applied to the secondary transfer roller 56, so that the overlapped toner images on the intermediate transfer belt 46 are secondarily transferred to the recording medium. Thus, the image forming unit 12 forms a toner image on the recording medium.

The recording medium with the toner image formed thereon passes the fixing device 13. At this time, the toner image on the recording medium, which is formed by the image forming unit 12, is fixed onto the recording medium. Additionally, the recording medium S on which the image is fixed by the fixing device 13 is discharged onto a recording medium discharge table 61 by a pair of paper discharge rollers 60.

This recording medium discharge table 61 is formed between the apparatus body 15 that houses the image forming unit 12, and the scanner 16. In this embodiment, the in-body paper discharge type copying machine 11 is employed that has a space between the apparatus body 15 on the downstream side in the paper discharge direction of the recording medium S by the pair of paper discharge rollers 60, and the scanner.

On the upstream side of the pair of paper discharge rollers 60, a changeover lever 62 is provided. In a case where this changeover lever 62 copies a rear surface of the recording medium S, when a front surface of the recording medium S is completed to be copied, the changeover lever 62 performs changeover to the side of a reversing path 63.

That is, when the rear end of the recording medium S is sandwiched between the pair of paper discharge rollers 60, the pair of paper discharge rollers 60 reversely drive, and the changeover lever 62 is switched to a position that communicates with the reversing path 63, so that the recording medium S is conveyed toward the reversing path 63. This reversing path 63 is provided with pairs of reversing rollers 64, and these pairs of reversing rollers 64 convey the recording medium conveyed on the reversing path 63 to the side of the secondary transfer roller 56 again.

Figure 5:
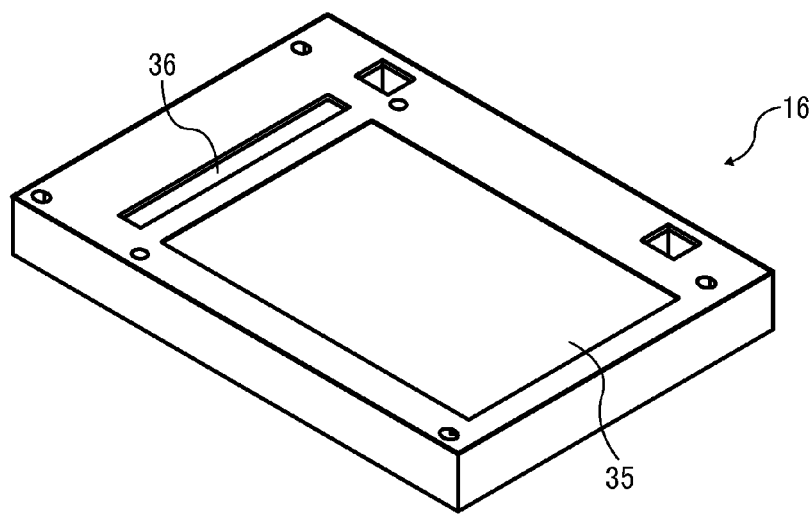
FIG. 5 is a perspective view showing a scanner.

FIG. 5 is a perspective view showing the scanner 16. Although not shown in FIG. 3 for convenience sake, the ADF 18 (not shown) is mounted on the scanner 16, and is pivotally supported by a hinge, so that the upper surface of the scanner 16 can be opened and closed. On the upper surface of the scanner 16, the contact glass 35 and the slit glass 36 as a transparent members are provided.

Figure 6:
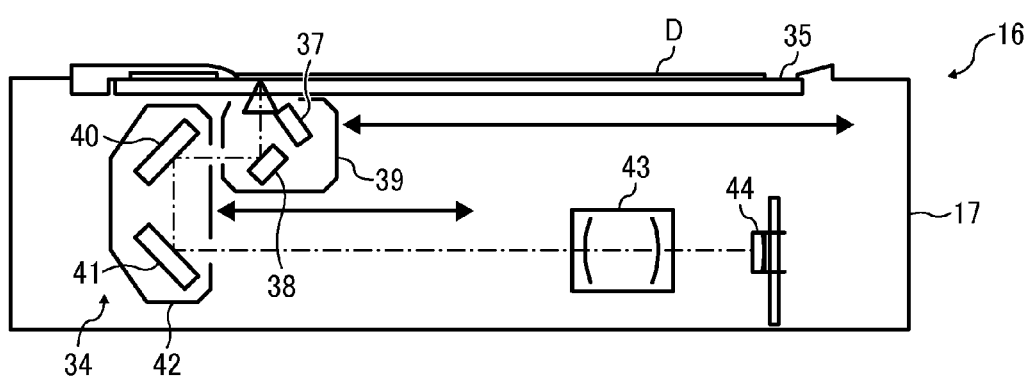
FIG. 6 is an enlarged configuration diagram showing an internal configuration of the scanner from the sides thereof.

FIG. 6 is an enlarged configuration diagram showing an internal configuration of the scanner 16 from the sides thereof. As shown in the FIG. 4, the housing 17 of the scanner 16 houses the first traveling body 39 as a first moving body, and the second traveling body 42 as a second moving body. Additionally, the housing 17 also houses the imaging lens 43, the CCD (Charge Coupled Device) image sensor 44 as an image pickup device, and the like.

The first traveling body 39 moves along the surface of the contact glass 35 while holding the light source 37 and the first mirror 38. At this time, light emitted from the light source 37 emits toward an image reading target surface of a document D via the contact glass 35, and reading light reflected on the image reading target surface is received by the first mirror 38.

The second traveling body 42 moves along the surface of the contact glass 35 at a predetermined distance from the first traveling body 39 while holding the second mirror 40, and the third mirror 41. Then, the reading light sent from the first mirror 38 of the first traveling body 39 is sequentially reflected on the second mirror 40, and the third mirror 41, and thereafter enters the imaging lens 43. The reading light that enters the imaging lens 43 is imaged on the light receiving surface of the CCD image sensor 44 to be read as an image. When the first traveling body 39 advances by a distance L, the second traveling body 42 advances by a distance L/2. Consequently, the optical path length of the optical system 34 is kept constant.

Figure 7:
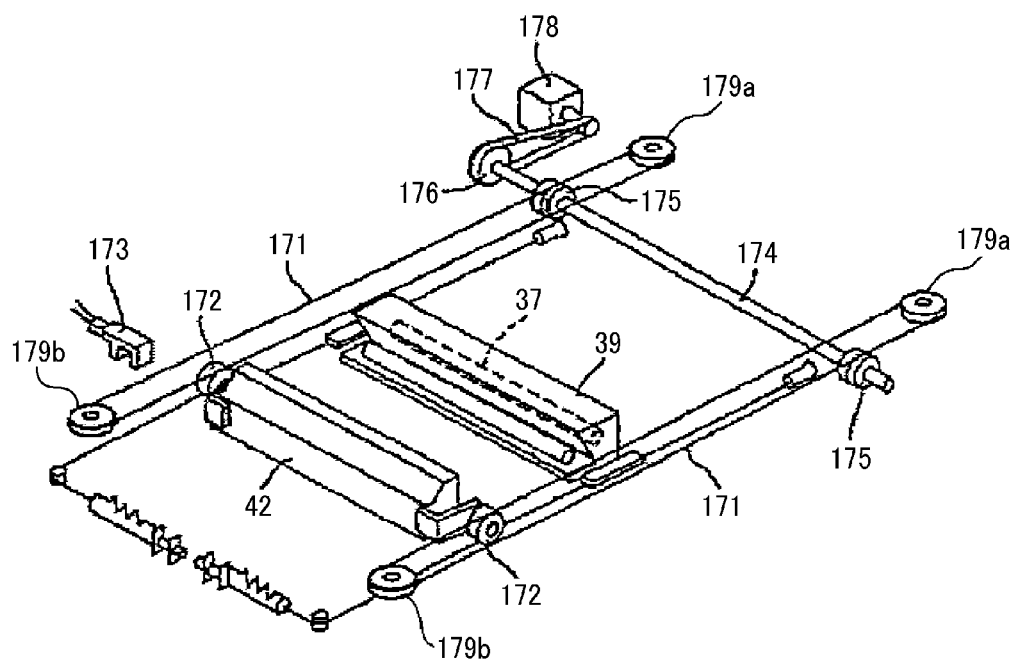
FIG. 7 is a perspective view showing a moving mechanism.

FIG. 7 is a perspective view showing a moving mechanism that causes the first traveling body 39 and the second traveling body 42 of the scanner 16 to move. In FIG. 5, the first traveling body 39 that holds the light source 37 and the first mirror 38 is mounted on driving wires 171. Additionally, the driving wires 171 are stretched between the idler pulleys 179*a* and 179*b*, and wound around pulleys 172 rotatably fixed to the second traveling body 42, and wire pulleys 175 fixed to a drive shaft. The drive shaft 174 is connected to a driving motor 178 via a timing pulley 176 and a timing belt 177. When the wire pulleys 175 are rotated as a drive transmission member of the drive shaft 174 by the driving motor 178, the driving wires 171 drive, the first traveling body 39 moves at a predetermined speed v, and the second traveling body that includes pulleys 172 moves at a speed v/2.

An end in a movable range of the first traveling body 39 in the sub scanning direction is a home position as a standby position of the first traveling body 39. When the first traveling body 39 is at a position that slightly advances to the other end side with respect to the home position, the first traveling body 39 is detected by a position sensor 173. A position deviated from a position detected by the position sensor 173 by a predetermined distance is the home position. In this scanner 16, as the driving motor 178 described above, a stepping motor is used. The number of driving pulses to the stepping motor is strictly correlated with the moving distance of the first traveling body 39. Accordingly, the position of the first traveling body 39 in the sub scanning direction can be correctly grasped by the number of driving pulses to the driving motor 178 from a time point when the first traveling body 39 is detected by the position sensor 173.

Figure 8:
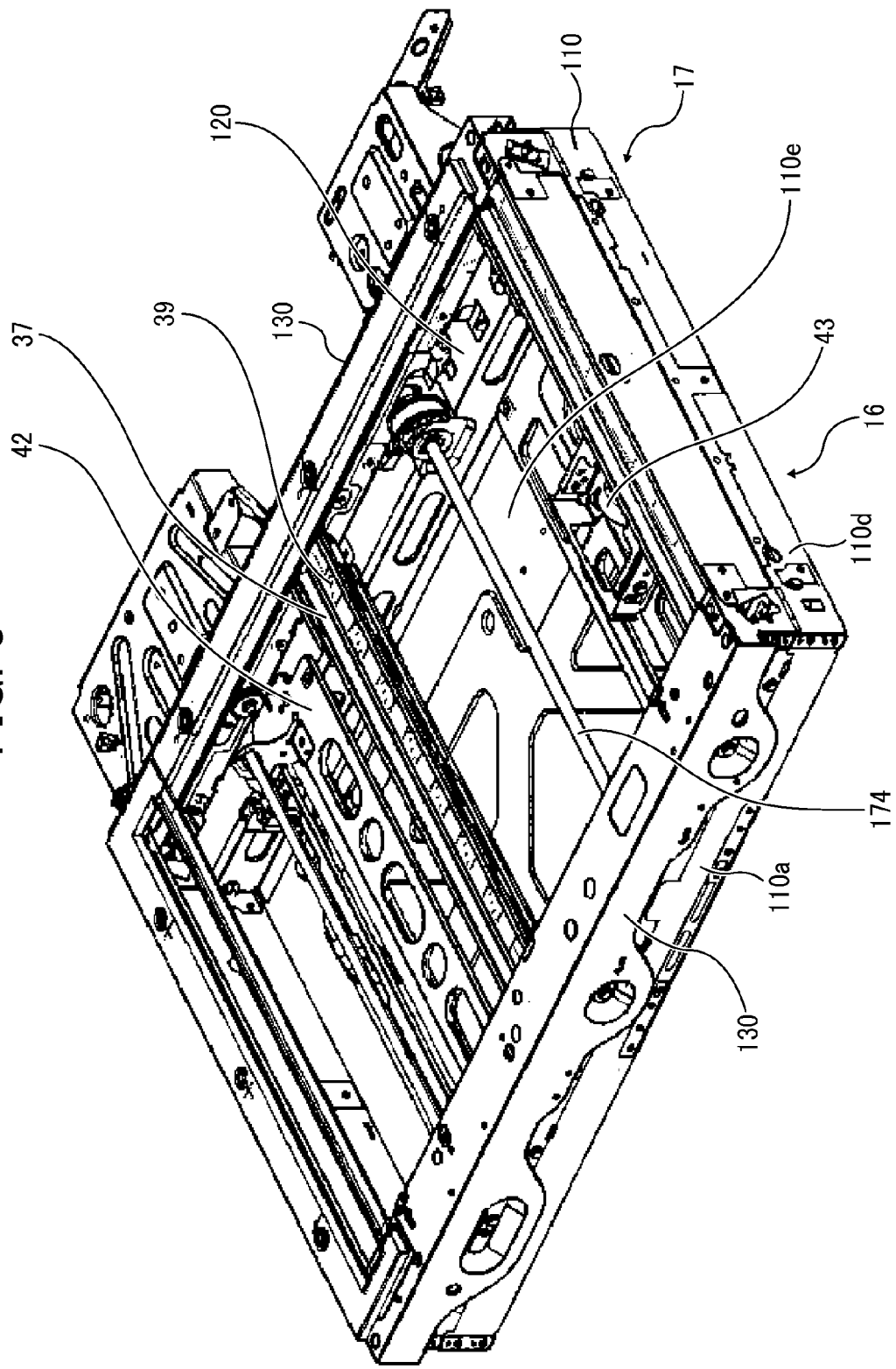
FIG. 8 is a perspective view showing an internal configuration of the scanner.

FIG. 8 is a perspective view showing an internal configuration of the scanner 16, and FIG. 7 is an exploded perspective view of the housing 17 that houses the first traveling body 39, the second traveling body, the imaging lens 43, the CCD image sensor 44, and the like.

Figure 9:
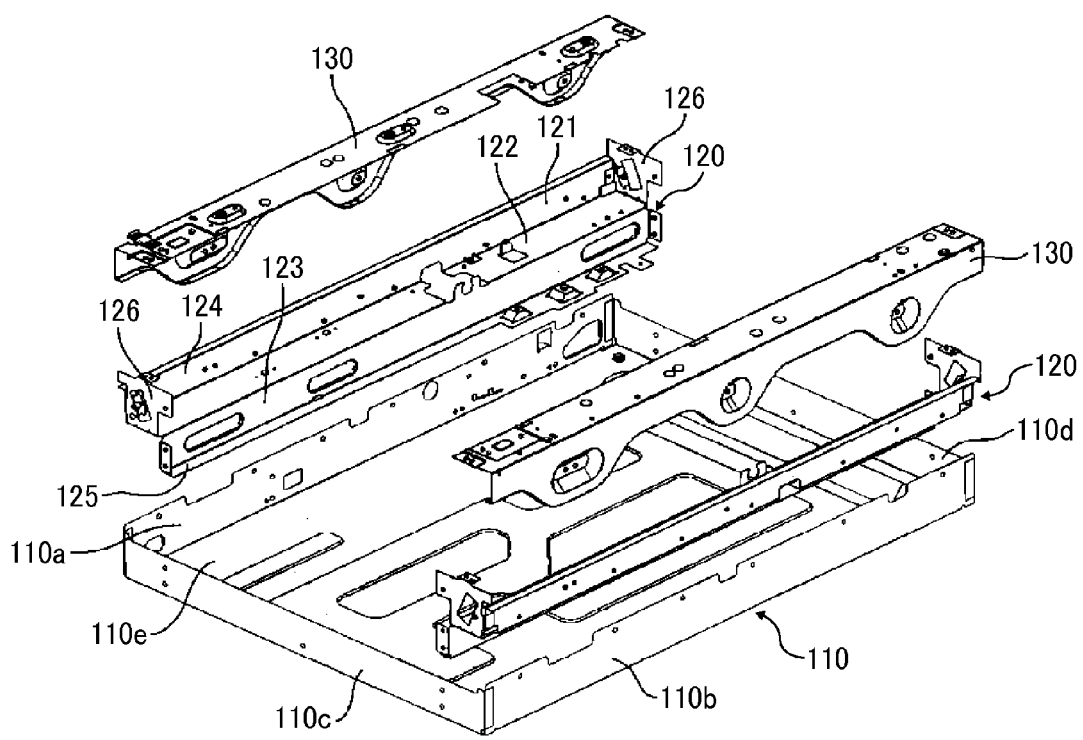
FIG. 9 is an exploded perspective view of a housing.

As shown in FIGS. 8 and 9, the housing 17 includes a box-shaped base member 110 that has a bottom surface 110*e*, and four side surfaces 110*a*, 110*b*, 110*c* and 110*d* that vertically rise from the four sides of the bottom surface 110*e*. Additionally, the housing 17 includes a pair of rail members 120 for allowing the first traveling body 39 and the second traveling body 42 to travel in the sub scanning direction. Furthermore, the housing 17 includes a pair of support frames 130 that support the contact glass 35 and the slit glass 36.

The rail members 120 are fixed to the both ends of the base member 110 in the main scanning direction. The rail members 120 each have a part formed by bending a sheet metal in a crank shape. Specifically, the rail members 120 have horizontal first rail surfaces 121 for allowing the first traveling body 39 to travel, and horizontal second rail surfaces 122 for allowing the second traveling body 42 to travel. First vertical surfaces 123 are formed by bending from one ends of the second rail surfaces 122 in the main scanning direction to the bottom surface 110*e* side of the base member 110 at a right angle. Additionally, second vertical surfaces 124 are formed by bending from the other ends of the second rail surfaces 122 to the upper side (contact glass side) at a right angle. The first rail surfaces 121 are formed by bending from the second vertical surfaces 124 to a side opposite to the second rail surfaces 122 side at a right angle. Additionally, on the both ends of the second vertical surfaces 124 in the sub scanning direction, side wall surfaces 126 formed by bending from the second vertical surfaces 124 to the second rail surfaces 122 side at a right angle are formed. Additionally, the rail members 120 have fixing surfaces 125 functioning as fixing parts, to the bottom surface 110*e* of the base member 110, the rail members 120 formed by bending from the lower ends of the second vertical surfaces 124 to the inside of the housing 17 at a right angle.

The first traveling body 39 is stretched between the first rail surfaces 121 of the respective rail members 120, and the second traveling body 42 is stretched between the second rail surfaces 122 of the respective rail members 120. The first traveling body 39 travels in contact with the vicinity of the ends of the first rail surfaces 121 on the second vertical surface 124 sides. Additionally, the second traveling body 42 travels in contact with the vicinity of the ends of the second rail surfaces 122 on the second vertical surface 124 sides. Thus, the first traveling body 39 and the second traveling body 42 travels in contact with the vicinity of the bent parts with high strength, and therefore it is possible to implement stable traveling.

The rail members 120 needs to be configured such that traveling surfaces of the first rail surfaces 121 and the second rail surfaces 122, on which the first traveling body 39 and the second traveling body 42 travel, are horizontal, in order to allow the first traveling body 39 and the second traveling body 42 to move horizontally. When the rigidity of the rail members 120 is low, the rail members 120 are warped, or deformed. Consequently, the traveling surfaces of the first rail surfaces 121 and the second rail surfaces 122 are not horizontal. Therefore, the rigidity of the rail members 120 is enhanced by forming the rail members with sheet metals whose plate thicknesses are thick, such that the rail members 120 are not warped or deformed.

In this embodiment, the rail members 120 include the first rail surfaces 121 for allowing the first traveling body 39 to travel, and the second rail surfaces 122 for allowing the second traveling body 42 to travel. The rail surfaces on which the first traveling body 39 travels, and the rail surfaces on which the second traveling body 42 travels are separately provided, resulting in the following advantage as compared to a case where the first traveling body 39 and the second traveling body 42 travel on the same rail surface. That is, in both the first traveling body 39 and the second traveling body 42, portions where the centers of gravity of the first traveling body 39 and the second traveling body 42 are stable can be brought into contact with the rail surfaces. Consequently, the first traveling body 39 and the second traveling body 42 can stably travel.

Additionally, in this embodiment, the rail members 120 are formed with the first rail surfaces 121 and the second rail surfaces 122, resulting in the following advantage as compared to a case where the first rail surfaces 121 and the second rail surfaces 122 are formed by separate members. That is, in order to obtain a preferable read image, position accuracy between the first rail surfaces 121 and the second rail surfaces 122 is important. In a case where the first rail surfaces 121 and the second rail surfaces 122 are formed by separate members, in order to obtain position accuracy between the rails, members that have the first rail surfaces 121, members that have the second rail surfaces 122 need to be accurately assembled respectively, and assembling workability is bad. On the other hand, like this embodiment, each first rail surface 121 and each second rail surface 122 are formed by a single member such that a member, in which preferable position accuracy between the rails is previously attained by machining, is mounted. Consequently, the position accuracy between the rails is not deteriorated by assembly. Accordingly, it is possible to improve assembling workability. Additionally, in the case where the first rail surfaces 121 and the second rail surfaces 122 are formed by separate members, the following problem occurs. That is, when either the fixing of the members that have the first rail surfaces 121 or the fixing of the members that have the second rail surfaces 122 loosens by long-time use, the positional relation between the rails collapses, and a read image may be deteriorated. On the other hand, in this embodiment, each first rail surface 121 and each second rail surface 122 are formed by a single member, so that the positional relation between the rails does not collapse during long-time use. Accordingly, a preferable read image can be obtained over time.

In this embodiment, in order to reduce the weight of the scanner 16, the base member 110 is set to have a minimum thickness capable of machining. Specifically, as previously shown in FIG. 7, draw processing is applied to the bottom surface 110e of the base member 110, and the thickness of the base member 110 is set to a minimum thickness (0.4 to 0.6 mm) capable of performing this draw processing. Thus, the thickness of the base member 110 is reduced to the utmost in order to reduce the weight of the scanner 16, thereby lowering the rigidity of the housing 17. Therefore, in this embodiment, the plate thicknesses of the rail members 120 each are thicker than the plate thickness of the base member 110, and the base member 110 is reinforced by the rail members 120, thereby enhancing the rigidity of the housing 17. In a case where the base member 110 is reinforced by the rail members 120, the plate thickness of each rail member 120 is preferably set to be twice or more the plate thickness of the base member 110. In this embodiment, the plate thickness of the base member 110 is set to 0.4 mm, and the plate thickness of each rail member 120 is set to 0.8 mm.

Thus, in this embodiment, the plate thickness of the base member 110 is reduced, and the rigidity of the base member is low. Therefore, when the base member 110 holds the imaging lens 43 and the CCD image sensor 44, the position of the imaging lens 43 or the CCD image sensor 44 may be displaced by the warp or the deformation of the base member 110. When the position of the imaging lens 43 or the CCD image sensor 44 is displaced, a preferable read image may not be able to be obtained. Therefore, in this embodiment, the rail members 120 that have high rigidity and are accurately formed are mounted on the CCD image sensor 44 and the imaging lens 43. Specifically, the CCD image sensor 44 and the imaging lens 43 are mounted on the rail members 120 via a lens block 145 that holds the CCD image sensor 44 and the imaging lens 43.

Figure 10:
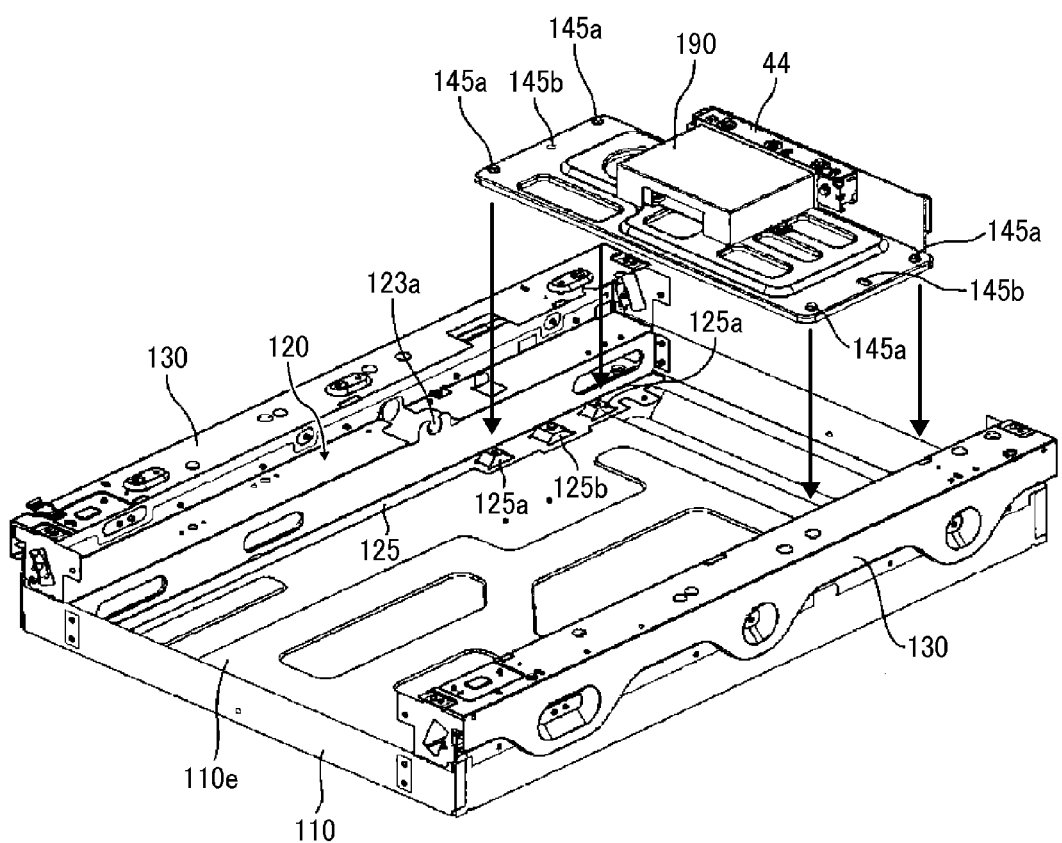
FIG. 10 is a diagram showing a manner in which a lens block is mounted on rail members.
Figure 11:
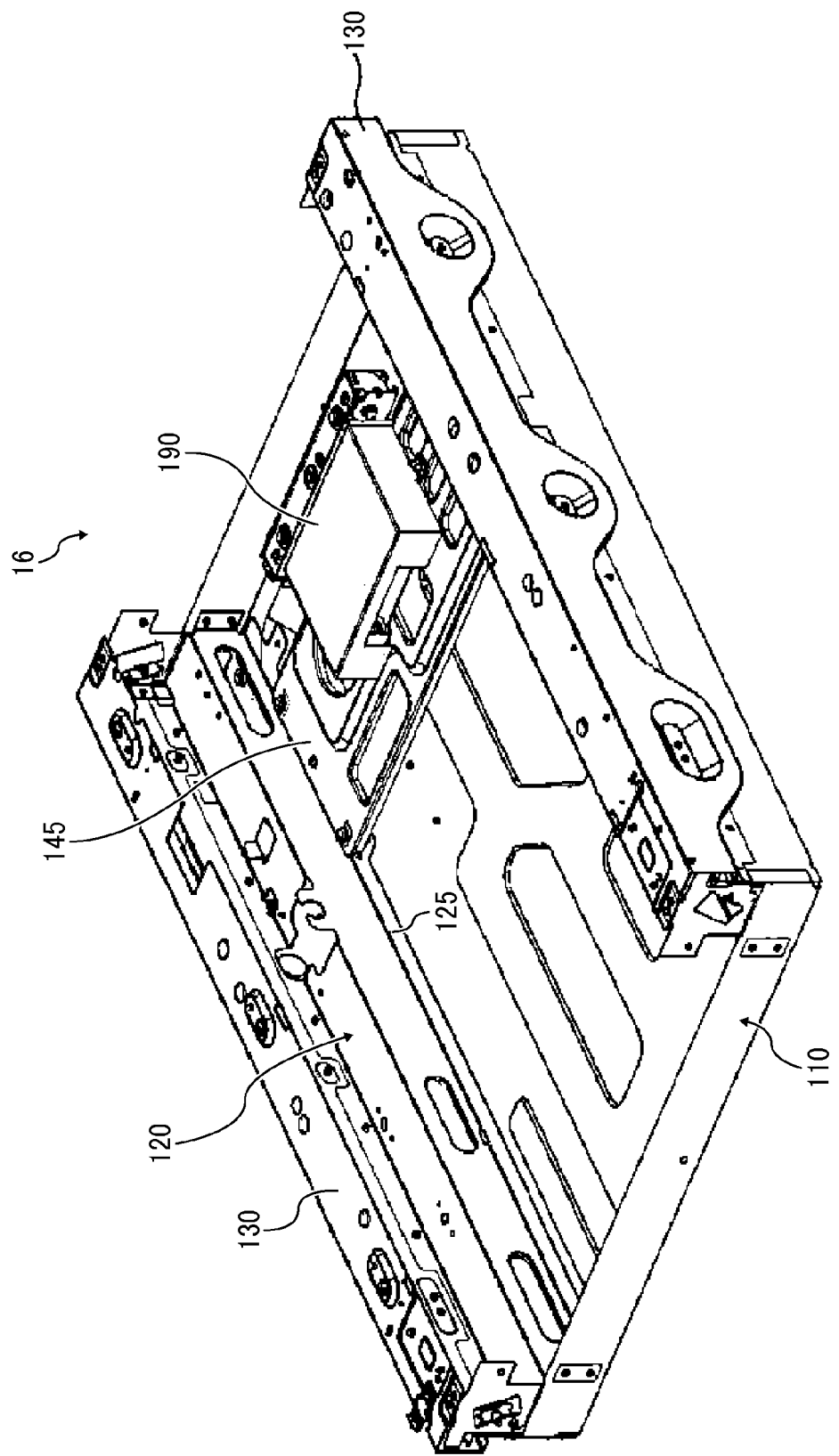
FIG. 11 is a diagram showing a state in which the lens block is mounted on the rail members.

FIG. 10 is a diagram showing a manner in which the lens block 145 is mounted on the rail members 120, and FIG. 11 is a diagram showing a state in which the lens block 145 is mounted on the rail members 120.

As shown in FIG. 10, two mount pedestals 125a for fixing the lens block 145 are provided in the vicinity of one ends of the fixing surfaces 125 of the rail members 120 in the sub scanning direction at a predetermined interval. Additionally, positioning pedestals 125b for positioning the lens block 145 to the rail members 120 are provided on the centers of the mount pedestals 125a. Screw holes formed by cutting screw grooves are provided on the respective centers of the mount pedestals 125a, and the positioning projections are provided on the centers of the positioning pedestals 125b.

The lens block 145 is made of a sheet metal with a plate thickness of 0.8 mm, and a lens unit 190 that holds the imaging lens 43 is screwed to the lens block 145, and the CCD image sensor 44 is fixed to the lens unit 190. The imaging lens 43 and the CCD image sensor 44 are fixed to the lens block 145 in a state where the relation between the imaging lens 43 and the CCD image sensor 44 is optically adjusted.

On the both ends of the lens block 145 on each of sides in the main scanning direction, two through holes 145a are formed at a predetermined interval in the sub scanning direction. Additionally, a positioning hole 145b is provided between the through holes 145a on each side. The positioning hole 145b on one end side of the lens unit is a long hole that extends in the main scanning direction, and the positioning hole 145b on the other side is a round hole that is slightly larger than the aforementioned positioning projection.

The positioning projections provided in the positioning pedestals 125b are fitted into the corresponding positioning holes 145b of the lens block 145 to position the lens block 145 with respect to the rail members 120. Then, screws are inserted into the through holes 145a of the lens block 145 to be fastened to the screw holes of the mount pedestals 125a, so that the lens block 145 is mounted on the rail members 120 (see FIG. 11).

In this embodiment, among members that configure the optical system 34, the light source 37 and the first mirror 38 are held by the rail members 120 via the first traveling body 39. Additionally, among the members that configure the optical system 34, the second mirror 40 and the third mirror 41 are held by the rail members 120 via the second traveling body 42. Furthermore, among the members that configure the optical system 34, the imaging lens 43 and the CCD image sensor 44 are held by the rail members 120 via the lens block 145. Thus, in this embodiment, all of the members that configure the optical system 34 are held by the rail members 120 that have high rigidity and are accurately manufactured. Consequently, it is possible to maintain preferable optical position accuracy between the respective members that configure the optical system 34. As a result, a preferable read image can be obtained.

Figure 12:
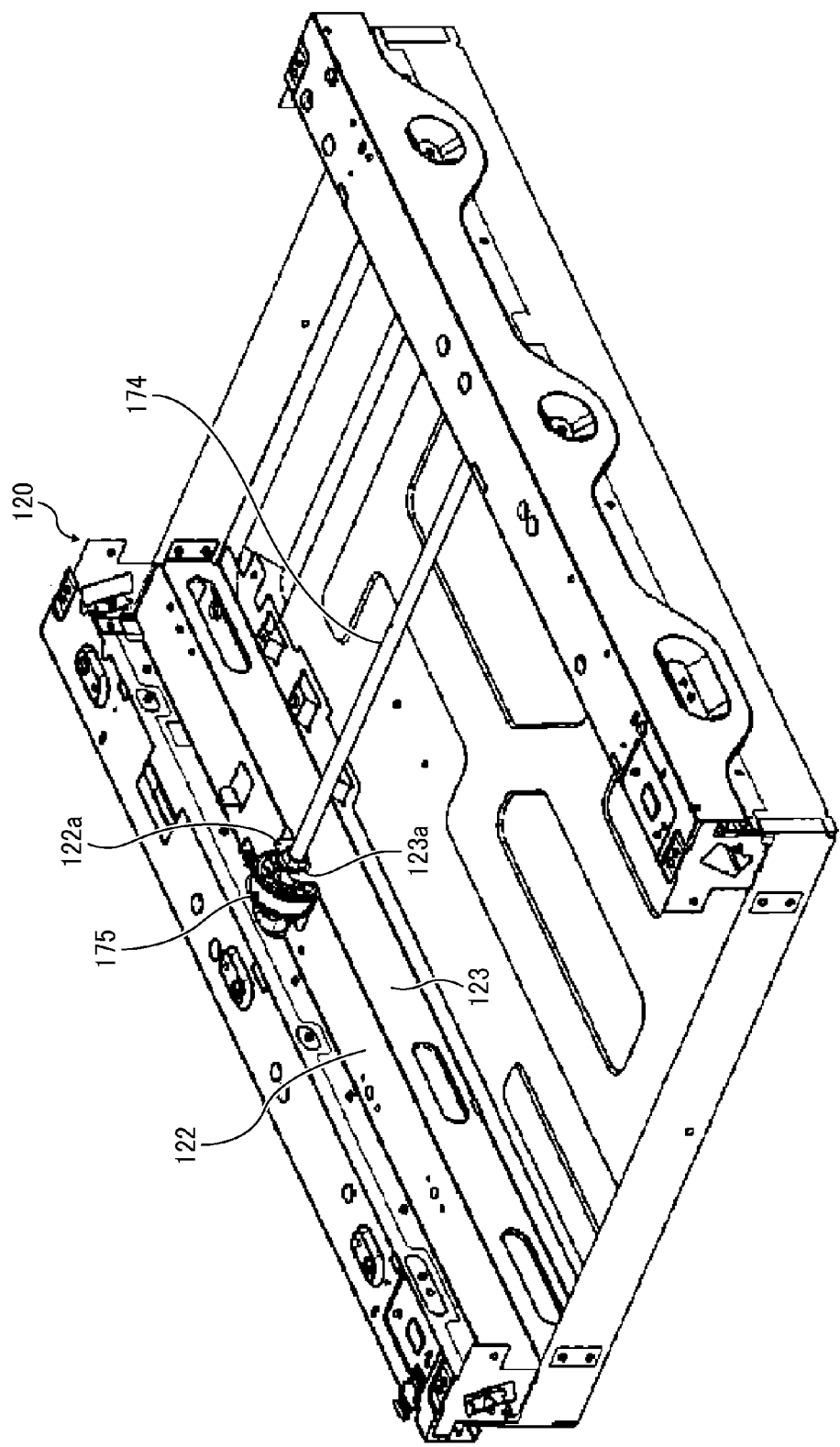
FIG. 12 is a diagram for illustrating the mounting of a drive shaft on the rail member.

Furthermore, in this embodiment, the drive shaft 174 and the idler pulleys 179a and 179b of the moving mechanism that causes the first traveling body 39 and the second traveling body 42 to move, previously shown in FIG. 5, are mounted on the rail members 120. As shown in FIG. 12, notches 122a for arranging the wire pulleys 175 fixed to the drive shaft 174 are provided on the substantially centers of the second rail surfaces 122 of the rail members 120. Additionally, bearing attaching holes 123a are provided on the substantially centers of the second vertical surfaces 124 of the rail members 120, and the drive shaft 174 is rotatably mounted on the bearing attaching holes 123a via bearings.

Figure 13:
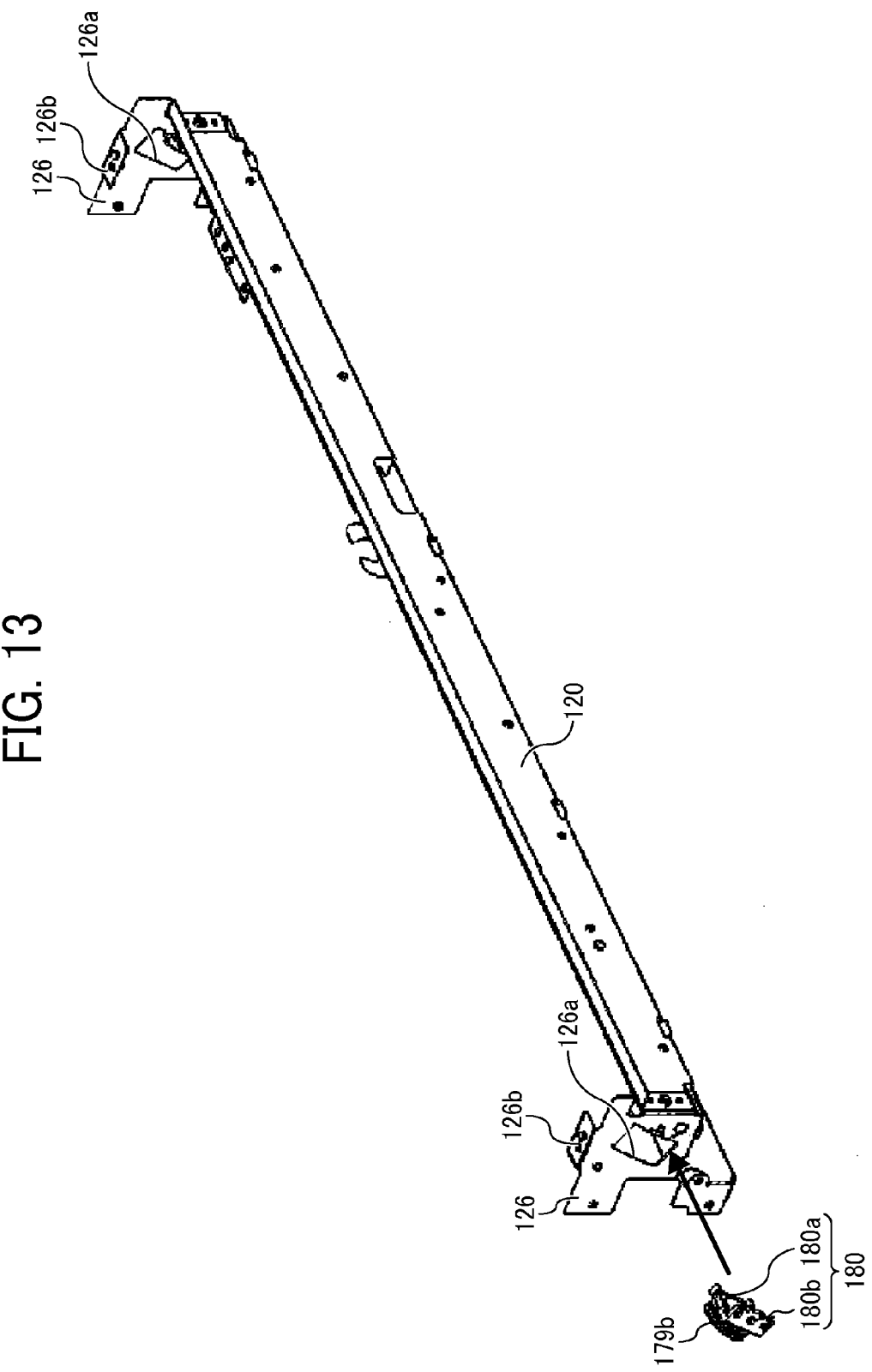
FIG. 13 is a diagram showing a manner in which an idler pulley is mounted on the rail member.

FIG. 13 is a diagram showing a manner in which the idler pulley 179b is mounted on the rail member 120.

As shown in FIG. 13, pulley attaching holes 126a are formed in the side wall surfaces 126 on the both ends of each rail member 120 in the sub scanning direction. Additionally, frame fixing surfaces 126b to which the support frame 130 is fixed are provided on the centers of the upper sides of the side wall surfaces 126. The idler pulley 179b is rotatably supported by a pulley holding surface 180a of a pulley holding member 180 having a substantially L-shaped cross section and including the pulley holding surface 180a and a mounting surface 180b.

Figure 14:
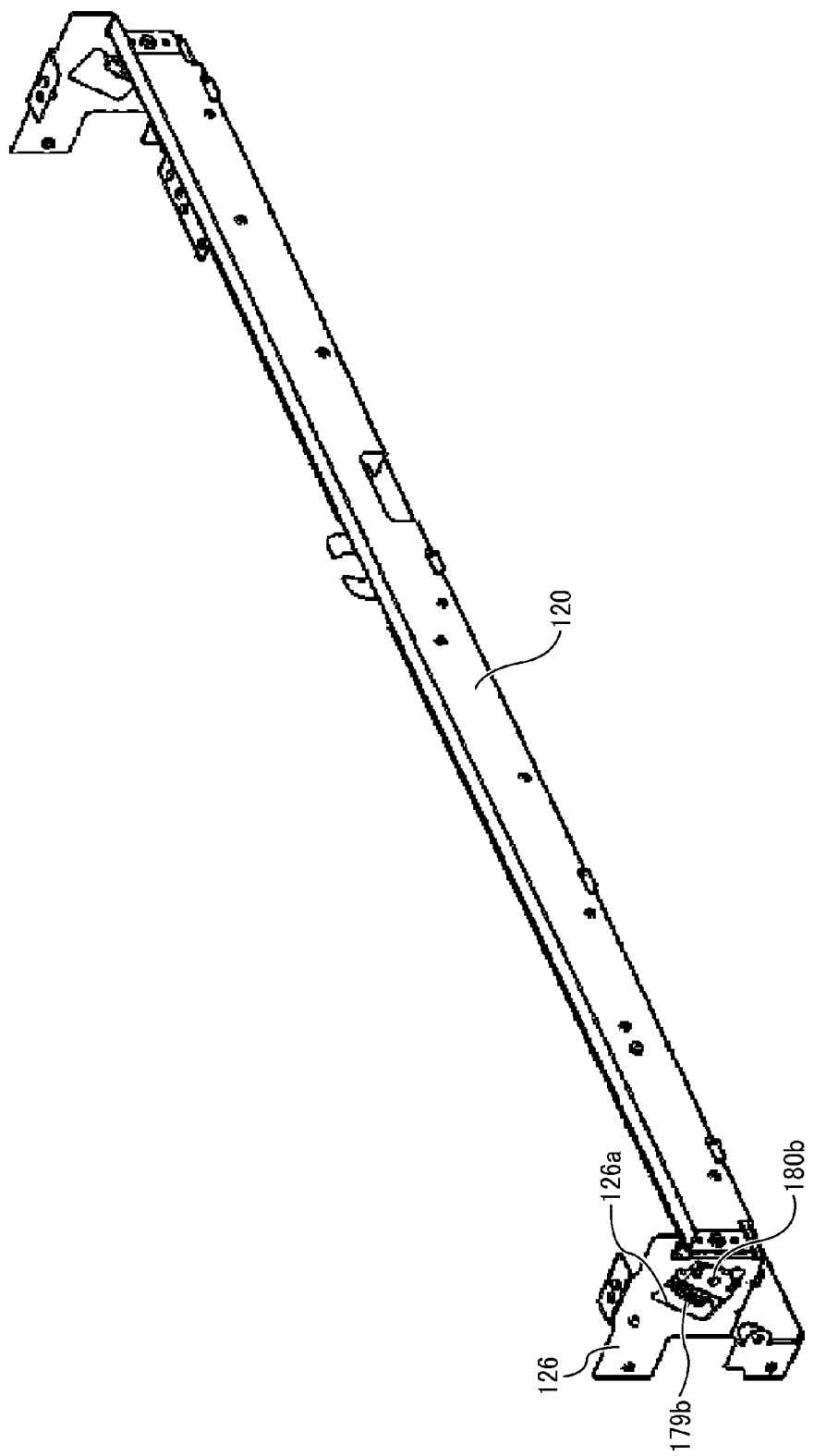
FIG. 14 is a diagram showing a state in which the idler pulley is held in the rail member.

FIG. 14 is a diagram showing a state in which the idler pulley 179b is held in the rail member 120.

The idler pulley 179b held in the pulley holding member 180 is inserted into the pulley attaching hole 126a of the side wall surface 126 on the front side in the FIG. 14, and the mounting surface 180b of the pulley holding member 180 is abutted against the side wall surface 126. Then, the mounting surface 180b is fixed to the side wall surface 126 with a screw, so that the idler pulley 179b is mounted on the rail member 120.

Although not shown in the drawing, the idler pulley 179a is mounted on the side wall surface 126 on the rear side in the drawing, similarly.

Thus, the idler pulleys 179a and 179b, and the drive shaft 174 are mounted on the rail members 120 with high rigidity, so that displacement of the idler pulleys 179a and 179b, and the drive shaft 174 can be reduced even in a case where a load is applied to the moving mechanism. Consequently, it is possible to prevent the looseness and the warp of the driving wires 171 at the time of applying a load to the moving mechanism, and to stabilize the traveling performance of the first traveling body 39 and the second traveling body 42.

Now, the fixing of the rail members 120 to the base member 110 will be described.

Figure 15:
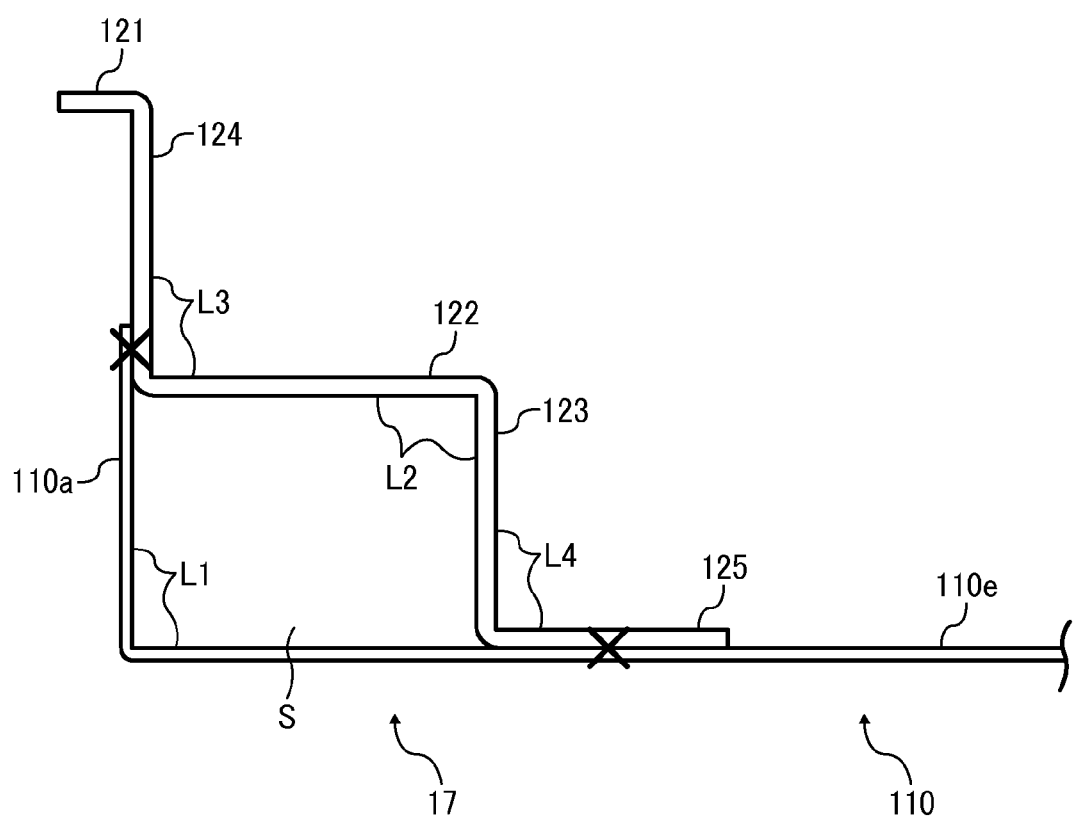
FIG. 15 is a sectional view of the housing in the vicinity of the rail member, from which a support frame is detached.

FIG. 15 is a sectional view of the housing 17 in the vicinity of the rail member 120, from which the support frame 130 is detached. As to configurations of the rail members 120, and the fixing of the rail members 120 to the base member 110, the respective rail members 120 are the same, and therefore the following description will be made for the rail member 120 on the one side in the main scanning direction (rear side in FIG. 9).

The rail member 120 is fixed to the side surface 110a and the bottom surface 110e of the base member 110 by caulking. Specifically, the second vertical surface 124 of the rail member 120 is fixed in the vicinity of the upper end of the side surface 110a of the base member 110 by caulking, and the fixing surface 125 of the rail member 120 is fixed to the bottom surface 110e of the base member 110 by caulking.

Figure 16:
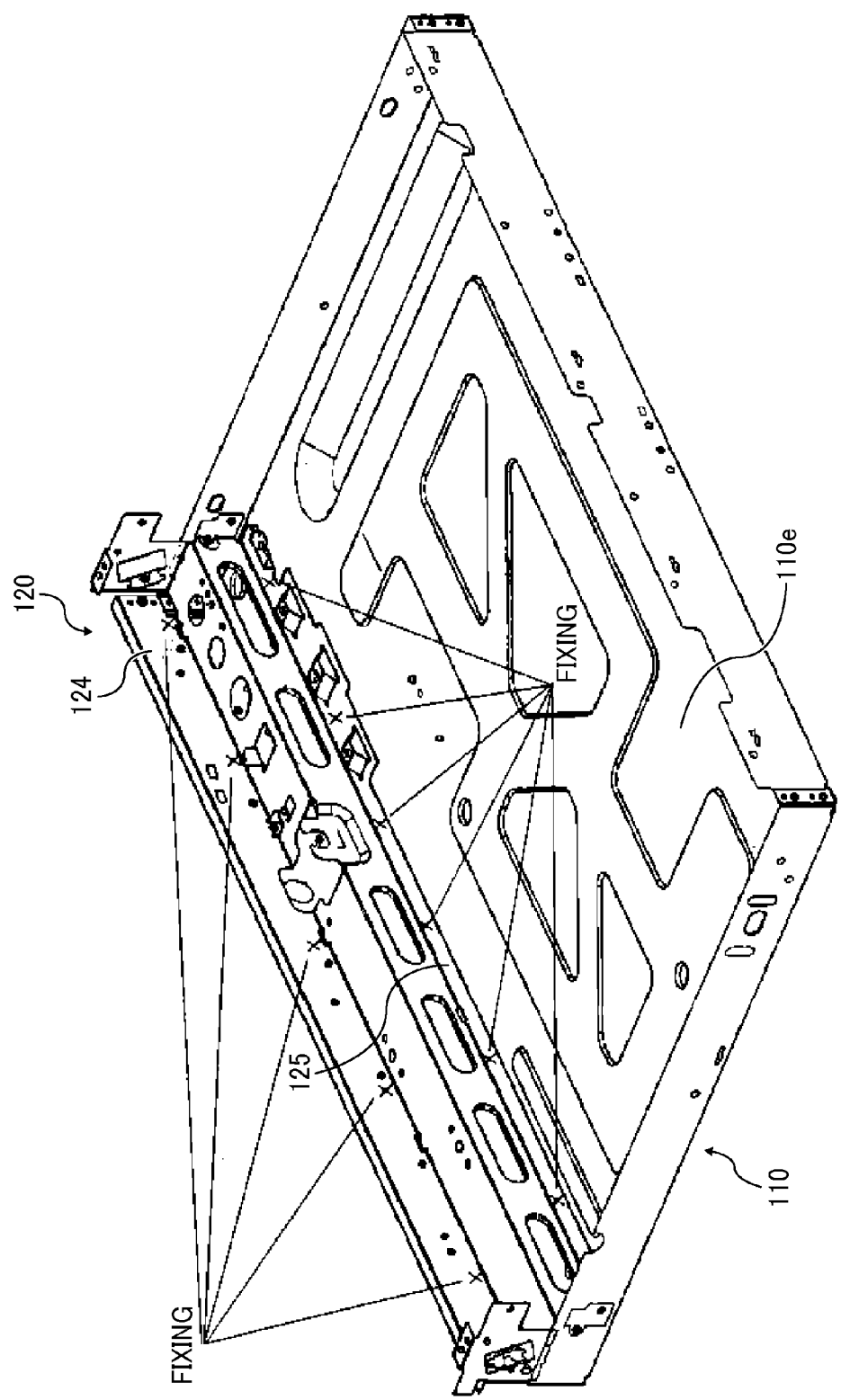
FIG. 16 is a perspective view showing joint portions of the rail member and a base member.
Figure 17:
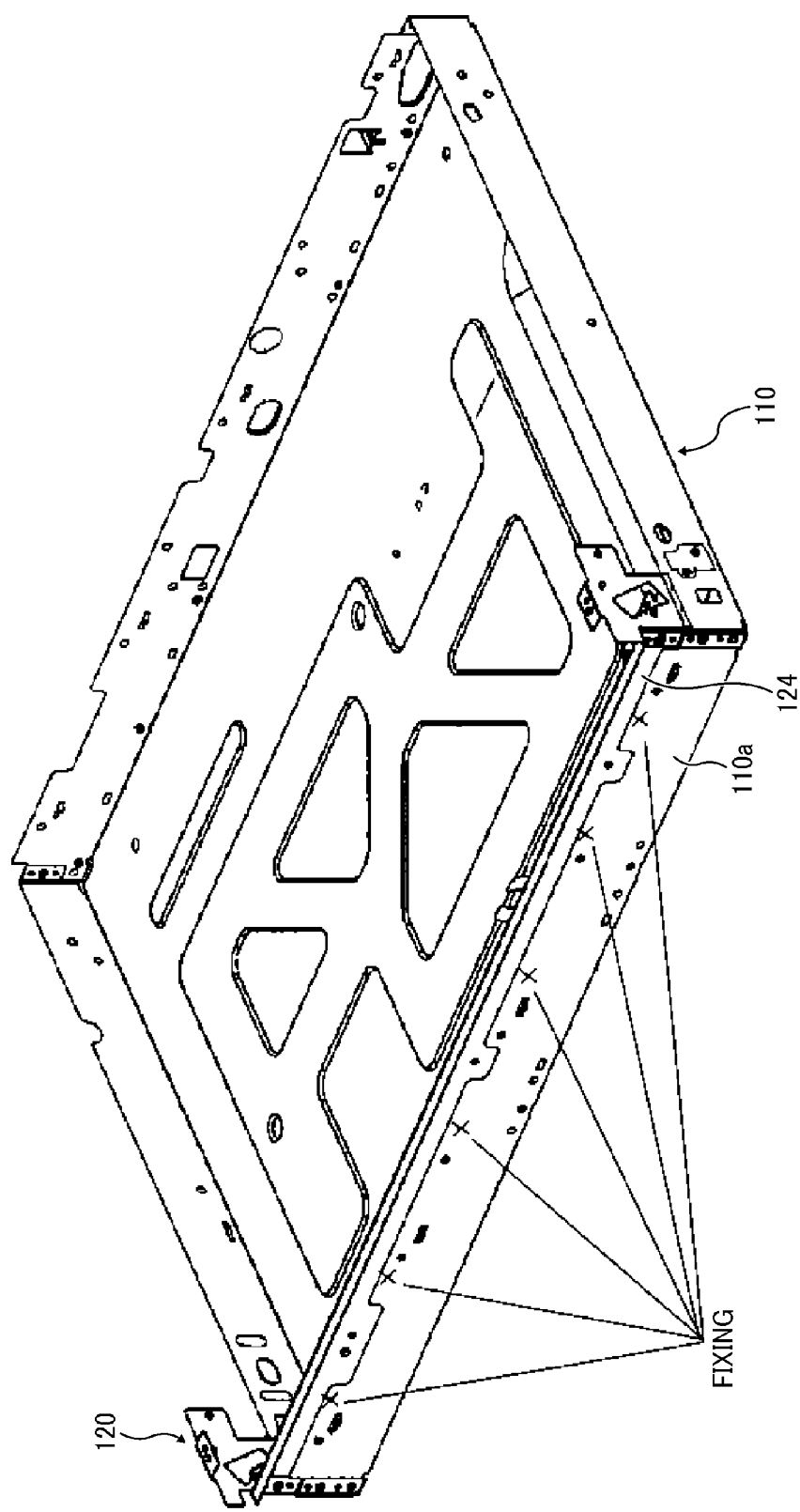
FIG. 17 is a perspective view showing joint portions of the second vertical surface of the rail member and the side surface of the base member.

FIGS. 16 and 17 each are a diagram showing joint portions of the rail member 120 and the base member 110. Portions indicated by the "×" mark in the drawings are the joint portions of the rail members 120 and the base member 110. As shown in FIGS. 16 and 17, the lower part of the second vertical surface 124 of the rail member 120 is joined to the upper part of the side surface 110a of the base member 110 by caulking. Additionally, on six portions in the sub scanning direction, the second vertical surface 124 of the rail member 120 is joined to the side surface 110a of the base member 110 by caulking. Additionally, as shown in FIG. 16, on six portions in the sub scanning direction, the fixing surface 125 of the rail member 120 is joined to the bottom surface 110e of the base member 110 by caulking.

As the caulking in this embodiment, a method of deforming and joining a plurality of sheets of sheet metals is used, and joining is attained by spot clinch joining, or mechanical clinching such as TOX (registered trademark) joining.

Figure 18:
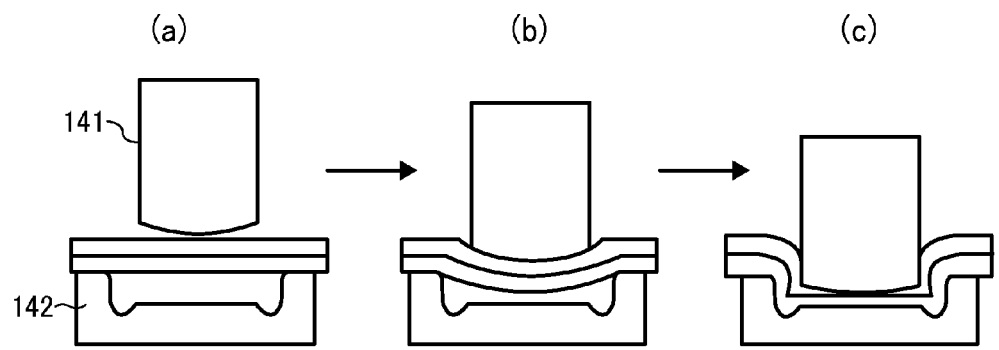
FIGS. 18A through 18C are explanatory diagrams of mechanical clinching.

FIGS. 18A through 18C are explanatory diagrams of mechanical clinching.

As shown in the drawings, in the mechanical clinching, sheet metals are overlapped to be placed on a die 142 formed with a recess, and the upper and lower sheet metals are meshed to be joined by being crushing by a punch 141. The mechanical clinching is more excellent in strength than burring caulking shown in FIG. 17 and press caulking shown in FIG. 18, since the join part in the mechanical clinching is large. Additionally, the mechanical clinching has another advantage that dusts do not enter inside the apparatus since it is not necessary to form a hole.

Although the rail member 120 is fixed to the base member 110 by caulking in this embodiment, the rail member 120 may be fixed to the base member 110 by screws. As described above, since the plate thickness of the base member 110 is thin, screw holes formed by cutting screw grooves cannot be formed in the base member 110. Therefore, in a case where the rail member 120 and the base member 110 are screwed, screw holes are formed on rail member 120 whose plate thickness is thick, and screws are fixed from the base member 110. In this case, in a case where the rail member 120 is screwed to the bottom surface 110e of the base member 110, the screws are fixed from the lower side, or the housing 17 is turned upside down for screwing, and therefore screwing work becomes complicated. On the other hand, in a case where the rail member 120 is fixed to the base member 110 by caulking, it is possible to fix the rail member 120 to the bottom surface 110e of the base member 110 without turning the housing upside down. Accordingly, workability is improved by caulking, as compared with a case of screwing. Since workability is not deteriorated even when the rail member 120 is fixed to the side surface of the base member 110 by screws, the fixing of the rail member 120 to the side surface of the base member 110 may be performed by screws. Additionally, the rail member 120 may be fixed to the base member 110 by welding the rail members 120 and the base member 110. However, a joining cost in a case of joining by caulking can be made cheaper than a case of joining by welding.

The fixing of the rail member 120 is performed by the two surfaces of the bottom surface 110e of the base member 110 and the side surface 110a orthogonal to the bottom surface 110e, so that a square pipe-shaped member S with a rectangular cross section can be formed on the both end of the housing 17 in the main scanning direction, as previously shown in FIG. 13. Specifically, by the aforementioned fixing, the square pipe-shaped member S is formed by an L-shaped cross-sectional member L1 formed by the bottom surface 110e and the side surface 110a of the base member 110, and an L-shaped cross-sectional member L2 formed by the second rail surface 122 and the second vertical surface 124. By the L-shaped cross-sectional member L1 and the L-shaped cross-sectional member L2, the warp or the deformation of the bottom surface 110e or the side surface 110a of the base member 110 can be reduced, and the base member 110 is reinforced. Additionally, an L-shaped cross-sectional member L3 formed by the second rail surface 122 and the second vertical surface of the rail member 120, and an L-shaped cross-sectional member L4 formed by the second vertical surface 124 and the fixing surface 125 also reduce the warp or the deformation of the bottom surface 110e or the side surface 110a of the base member 110. Thus, the base member 110 is reinforced by the rail member 120, so that even when the plate thickness of the base member 110 is made thin, the rigidity of the housing 17 can be secured, and the twist deformation, the bending deformation, or the like of the housing 17 can be prevented.

Additionally, in this embodiment, as shown in FIG. 15, the rail member 120 is formed by bending the sheet metal on four portions, thereby forming four L-shaped cross-sectional parts. In a known technique, the number of bent portions of the rail member is three. In this embodiment, the fixing surface 125 fixed to the bottom surface 110e of the base member 110 is formed by bending the second vertical surface 124, thereby forming four bent portions. Consequently, the rigidity of the rail member 120 can be enhanced as compared to a rail member of the known technique. Additionally, the fixing surface that is fixed to the bottom surface 110e of the base member 110 is provided on the whole area of the rail member 120 in the sub scanning direction. Consequently, it is possible to obtain an effect of increase in rigidity by bending of the whole area of the rail member 120 in the sub scanning direction. Consequently, even when the plate thickness of the base member 110 is made thin, it is possible to reduce the deformation of the housing 17.

The fixing surface 125 that is fixed to the bottom surface 110e of the base member 110 is formed by bending the second vertical surface 124, so that the rail member 120 can be fixed to the bottom surface 110e of the base member 110 by mechanical clinching. Consequently, different from the above-described known technique, it is not necessary to form a hole in the bottom surface 110e. Consequently, work for forming a hole in the bottom surface 110e is unnecessary, and a manufacturing cost can be reduced.

Additionally, the support frame 130 that supports the contact glass 35, as described above, is also mounted on the rail member 120.

Figure 21:
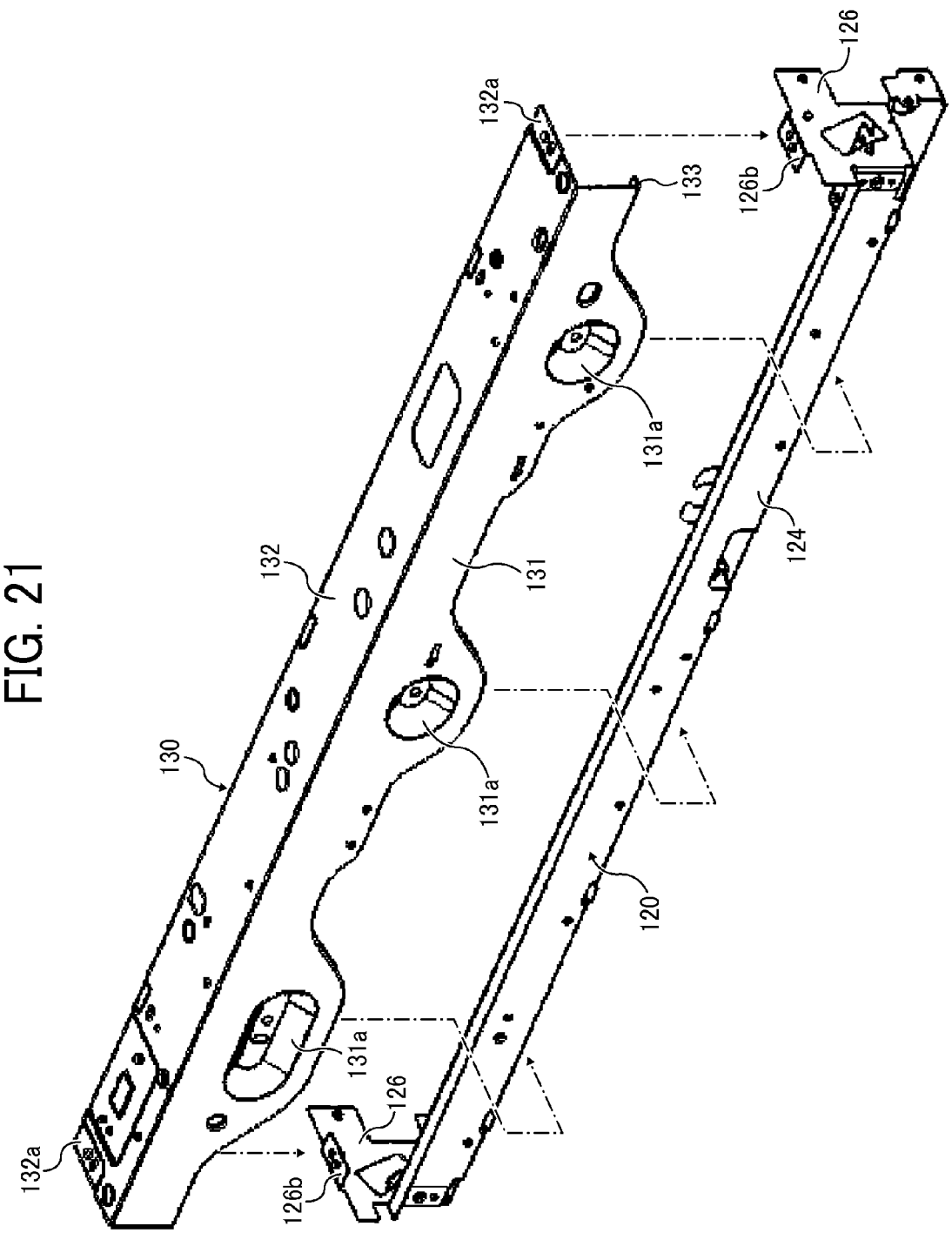
FIG. 21 is a diagram showing a manner in which the support frame is mounted on the rail member.

FIG. 21 is a diagram showing a manner in which the support frame 130 is mounted on the rail member 120.

As shown in FIG. 21, the support frame 130 is formed by applying bending processing or draw processing to a sheet metal, and has a contact glass placing surface 132 on which the contact glass 35 is placed. Additionally, the support frame 130 has a rail fixing surface 131 for fixing the second vertical surface 124 of the rail member 120, which is formed by bending from the outer end of the contact glass placing surface 132 in the main scanning direction downward at a right angle. The rail fixing surface has three first fixing members 131a that are recessed to the second vertical surface side of the rail member 120 by draw processing. These recessed fastening members 131a each have a bottom surface formed with a through hole through which a screw passes. Additionally, on the both ends of the contact glass placing surface 132 in the sub scanning direction, second fixing members 132a for fixing the frame fixing surfaces 126b of the rail members 120 are provided. Additionally, the support frame 130 has a reinforcing surface 133 formed by bending from the lower end of the rail fixing surface 131 to the rail member 120 side at a right angle.

When a book document like a book that has a certain amount of pages is opened and an image thereof is read, a user sometimes presses the book document against the contact glass 35 so as not to separate a page part in the vicinity of a binding margin of the book document from the surface of the contact glass 35. In this case, the contact glass placing surface 132 may warp or the like, and be located inside the housing. The first traveling body 39 is arranged right under the contact glass placing surface 132. Accordingly, when the contact glass placing surface 132 warps inside the housing, the first traveling body 39 may hit against the contact glass placing surface 132 at the time of the reading of the image. Additionally, when the rigidity of the support frames 130 is low, and warp or twist is likely to occur, the levelness of the surface of the contact glass placing surface 132, on which the contact glass 35 is placed cannot be maintained. As a result, the contact glass 35 is inclined to be placed, and the quality of the read image may be deteriorated. Accordingly, the support frame 130 needs to have a certain degree of the rigidity so as not to warp or twist. Therefore, in this embodiment, the plate thickness of the support frame 130 is made the same as the plate thickness of the rail members 120, and the support frame 130 is configured to have higher rigidity than the base member 110. Consequently, the warp or the deformation of the support frames 130 can be reduced, and the contact glass 35 can be accurately supported. Additionally, even in a case where the user presses the book document against the contact glass 35 to read an image, it is possible to prevent the warp of the contact glass placing surface 132 inside the housing. Consequently, the first traveling body 39 can be prevented from hitting against the contact glass placing surface 132 at the time of the reading of the image.

Furthermore, in this embodiment, bending processing is applied to the three portions of the support frame 130, and draw processing is further applied to the three portions of the rail fixing surface 131 in the sub scanning direction. Consequently, the rigidity of the support frames 130 can be enhanced, and the warp or the deformation of the support frame 130 can be prevented.

Now, description will be made for the fixing of the support frame 130 to the rail member 120.

Figure 22:
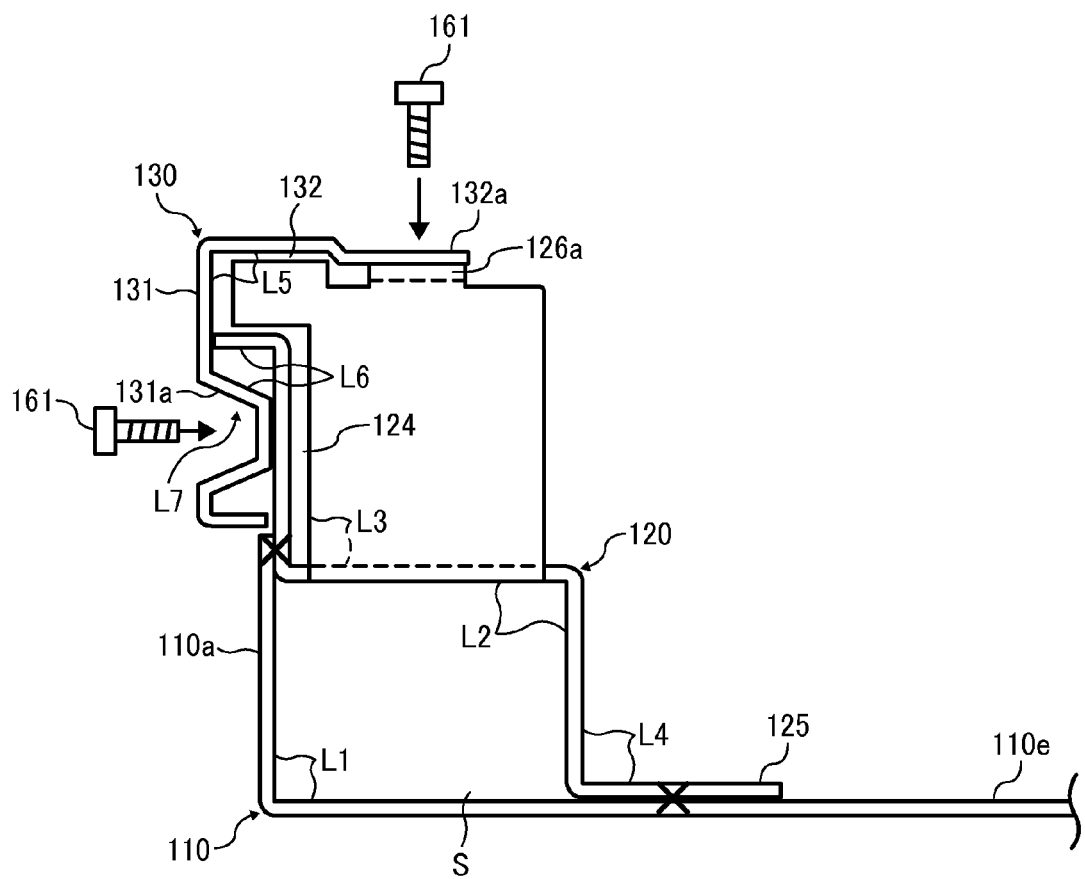
FIG. 22 is a diagram for illustrating the fixing of the support frame to the rail member.

FIG. 22 is a diagram for illustrating the fixing of the support frame 130 to the rail member 120.

Figure 19:
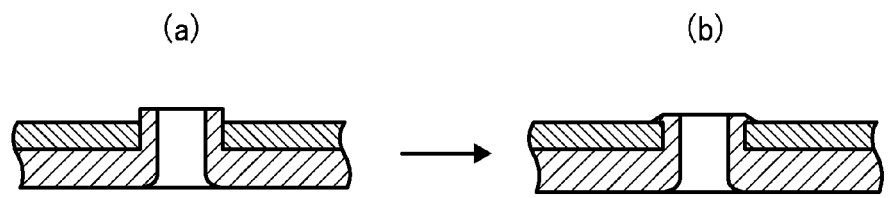
FIG. 19 is an explanatory diagram of burring caulking.
Figure 20:
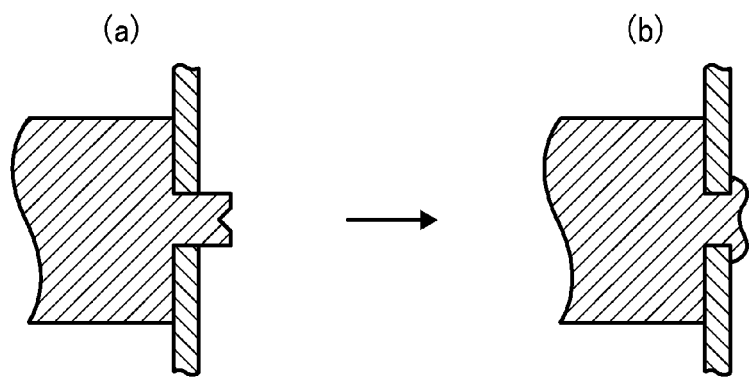
FIG. 20 is an explanatory diagram of pressing caulking.

As shown in FIG. 22, the support frame 130 is screwed to the screw holes provided on the second vertical surface 124 of the rail member 120 by insertion of screws 161 into the through holes provided on the bottom surface of the first fixing members 131a previously shown in FIG. 19. Additionally, the support frame 130 is screwed to the frame fixing surfaces 126b of the rail member 120 by the insertion of screws 161 into the through holes of the second fixing members 132a provided on the both ends of the contact glass placing surface 132 in the sub scanning direction.

In this embodiment, the support frame 130 is fixed to the second vertical surface 124 of the rail member 120, and the frame fixing surfaces 126b orthogonal to the second vertical surfaces 124. Consequently, the rigidity of the both ends of the housing 17 in the main scanning direction can be further enhanced by the support frame 130. More specifically, the deformation of the side surface of the housing 17 (surface that is configured by the side surface 110a of the base member 110 and the second vertical surface 124 of the rail member 120) can be reduced by the following L-shaped cross-sectional members of the support frame 130. That is, an L-shaped cross-sectional member L5 between the contact glass placing surface 132 and the rail fixing surface 131 prevents the deformation. Additionally, an L-shaped cross-sectional member L6 between each first fixing member 131a and the rail fixing surface 131, and an L-shaped cross-sectional member L7 between the side surface of each first fixing member 131a and the bottom surface formed with each through hole also prevents the deformation of the side surface of the housing 17. Thus, the support frame 130 can reinforce the both ends of the housing 17 in the main scanning direction, thereby further enabling a reduction of the deformation of the housing 17.

Additionally, when the user presses a book document or the like against the contact glass 35, or the like, the inclination of the contact glass placing surface 132 on the support frame 130 to the inside of the housing can be prevented by the following L-shaped cross-sectional members. That is, the L-shaped cross-sectional members L2, L3 and L4 of the rail member 120 and the L-shaped cross-sectional member L1 of the base member 110 can prevents the inclination. Consequently, when the user presses the book document or the like against the contact glass 35 to read an image, it is possible to reduce the hitting of the first traveling body 39 against the contact glass placing surface 132.

In this embodiment, the support frame 130 is provided, and the contact glass placing surface 132 is provided on a member different from the rail member 120 provided with the first rail surface 121 and the second rail surface 122. Then, the support frame 130 is screwed to the rail member 120, and the support frame 130 is detached from the rail member 120 by the detaching of the screws. Consequently, the following advantage can be obtained. That is, in the conventional configuration, in which the document placing surface is provided in the rail member 120, previously shown in FIG. 22, for example, when the light source 37 held by the traveling body reaches the end of a life and the traveling body is replaced, the document placing surface becomes an obstacle at the time of detaching of the traveling body. On the other hand, in this embodiment, when the traveling body is replaced, the support frame 130 formed with the contact glass placing surface 132 is detached from the rail member 120, so that the contact glass placing surface 132 does not become an obstacle at the time of the replacement of the traveling body. Accordingly, it is possible to easily replace the traveling body.

Additionally, the support frame 130 may be screwed at two portions in the vertical direction with respect to the second vertical surface 124 of the rail member 120. In a case where the support frame 130 is screwed at one portion in the vertical direction with respect to the second vertical surface 124 of the rail member 120, the following problem may occur. That is, when the user presses the book document against the contact glass to read an image, stress is concentrated on a screwing part of the support frame 130 with the second vertical surface 124 of the rail member 120. As a result, the second vertical surfaces 124 may warp to the outside, and the contact glass placing surface 132 of the support frame 130 may be inclined to the inside of the housing. In this case, the first traveling body 39 under movement in the sub scanning direction inside the housing may hit against the contact glass placing surface 132 of the support frame 130.

On the contrary, the support frame 130 is screwed at the two portions in the vertical direction with respect to the second vertical surface 124 of the rail member 120, so that load applied to the screwing parts can be distributed, and the warp of the second vertical surface 124 to the outside can be prevented. Consequently, it is possible to reduce the hitting of the contact glass placing surface 132 on the support frame 130 against the first traveling body 39.

Figure 23:
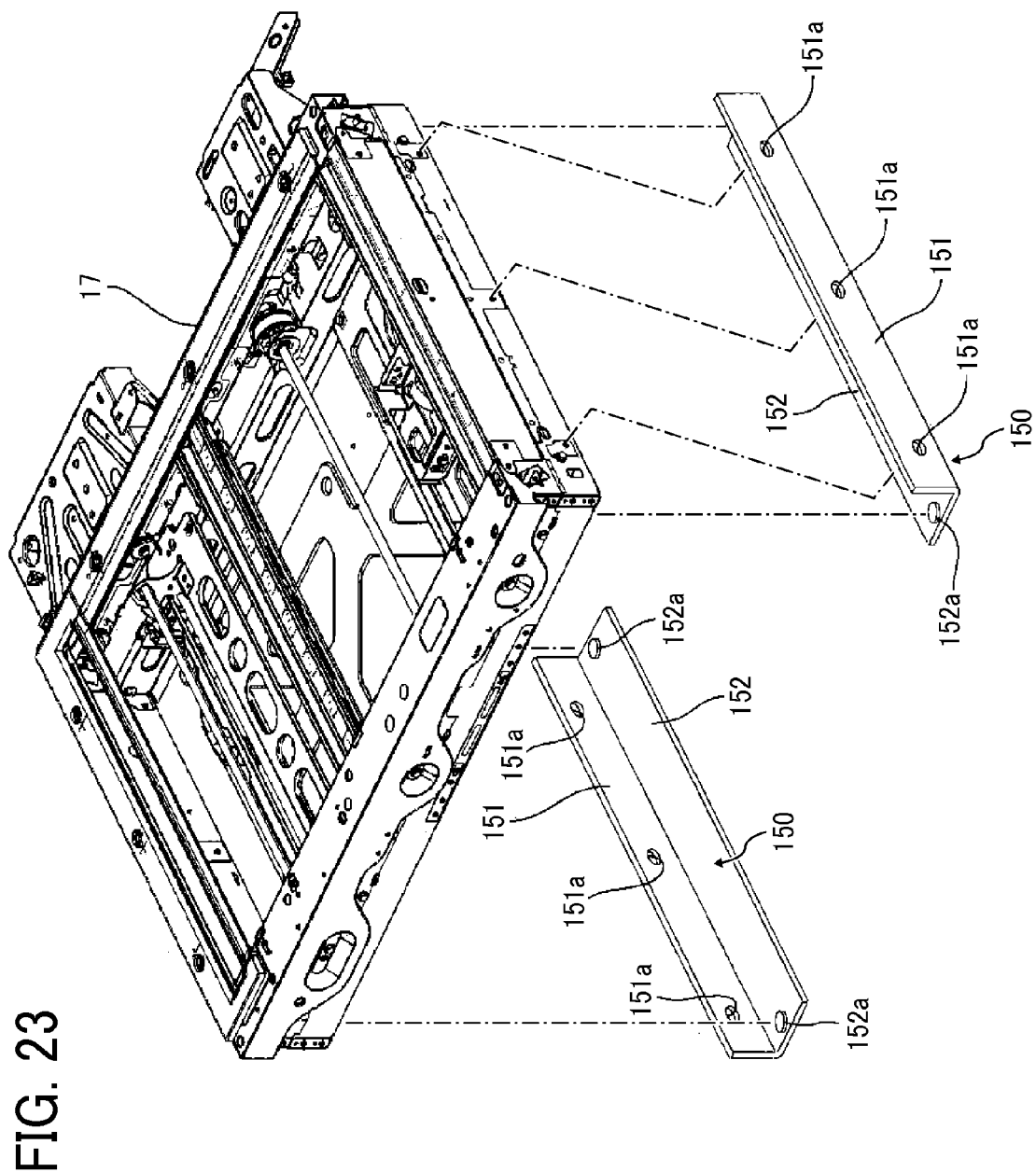
FIG. 23 is a diagram for illustrating the fixing of the housing to an apparatus body.

FIG. 23 is a diagram for illustrating the fixing of the housing 17 to the apparatus body.

The apparatus body 15 of the image forming apparatus includes a pair of scanner supporting plates 150 for placing and fixing the scanner 16. One of the scanner supporting plates 150 supports one end side of the scanner 16 in the longitudinal direction of the housing 17 (sub scanning direction), and the other of the scanner supporting plates 150 supports the other end side in the longitudinal direction of the housing 17 (sub scanning direction). Each scanner supporting plate 150 has an L-shaped cross-section, and includes a housing supporting surface 152 that supports the housing 17, and a housing fixing surface 151 on which the housing is fixed. On the housing fixing surface 151, three through holes 151a through which screws pass are provided at predetermined intervals in the short direction of the housing 17 (main scanning direction). On the both ends of the housing supporting surface 152 in the main scanning direction, housing supporting projections 152a for supporting the housing 17 are provided.

The four corners of the housing 17 are supported by the housing supporting projections 152a of the pair of scanner supporting plates 150. Then, the screws are inserted into the respective through holes 151a to be screwed to the screw holes that have screw grooves provided on the both side surfaces of the housing 17 in the main scanning direction, so that the housing 17 is fastened to the pair of scanner supporting plates 150.

In this embodiment, the four corners of the scanner 16 are supported by the four housing supporting projections 152a. The four corners of the housing 17 are parts where square pipe shapes are formed by the rail members 120 and the base member 110, and the rigidity of the housing is secured. Thus, the square pipe-shaped members of the housing, in which the rigidity of the housing 17 is secured, are supported, so that the deformation of the housing due to the weight of the scanner can be minimized. As a result, it is possible to secure the position accuracy of the respective members housed in the housing 17, and to obtain a preferable read image.

The embodiment described above is an example, and the present invention exerts a particular effect for each of the following aspects.

[Aspect 1]

There is provided an image reading device such as a scanner 16 that includes a traveling body (includes the first traveling body 39 and the second traveling body 42 in this embodiment) that guides light of a light source 37, which is reflected from a document surface on a plate-like transparent member, to an image pickup device such as a CCD image sensor 44, while moving in a sub scanning direction along the document surface of a document placed on the transparent member such as a contact glass 35, and a housing 17 that houses the image pickup device and the traveling body, wherein the housing 17 includes a base member 110 that has a rectangular bottom surface 110e, and side surfaces 110a to 110d which vertically rise from this bottom surface 110e, and has an L-shaped member L1 formed by the bottom surface 110e and the side surface 110a, and a rail member 120 that has a second rail surface 122 parallel to the bottom surface 110e on which at least the traveling body travels (the second traveling body 42 in this embodiment), and a first vertical surface 123 which vertically falls from a side of one end of the second rail surface 122, and has an L-shaped member L2 formed by the second rail surface 122 and the first vertical surface 123, the rail member 120 is fixed to the side surface 110a of the base member 110 and the bottom surface 110e of the base member 110, so that a square pipe shape S is formed by the L-shaped member L1 of the base member 110 and the L-shaped member L2 of the rail member 120, and a fixing surface 125 of the rail member 120, which is fixed to the bottom surface 110e of the base member 110, is a surface that is formed by being vertically bent from the first vertical surface 123 and extends from one end of the rail member 120 in the sub scanning direction to the other end.

With such a configuration, as described in the embodiment, it is possible to properly prevent the twist or the bending deformation of the housing even when the plate thickness of the base member 110 is made thin.

[Aspect 2]

In Aspect 1, the plate thickness of the base member 110 is thinner than the plate thickness of the rail member 120.

With such a configuration, as described in the embodiment, the weight of the apparatus can be reduced.

[Aspect 3]

In Aspect 1 or Aspect 2, the image reading device includes a first traveling body 39 that has at least the light source 37, and a second traveling body 42 that has a reflector (the second mirror 40 and the third mirror 41 in this embodiment) which travels on the rail surface, and reflects the light of the light source 37 reflected from the document surface on the transparent member, and guides the light to the image pickup device such as the CCD image sensor 44, and the rail member 120 includes the second vertical surface 124 that vertically rises from the other end of the second rail surface 122, and the rail surface 121 for the first traveling body, which is formed by being vertically bent from the second vertical surface 124, and allows the first traveling body 39 to travel.

With such a configuration, as described in the embodiment, it is possible to cause the first traveling body 39 and the second traveling body 42 to stably travel.

[Aspect 4]

In any of Aspect 1 to Aspect 3, the housing 17 includes a support member such as the support frame 130 that supports the transparent member such as the contact glass 35, and the support member is detachably fixed to the rail member 120.

With such a configuration, as described in the embodiment, the replacement or the maintenance of the traveling bodies 39 and 42 can be easily performed.

[Aspect 5]

In Aspect 4, the support member such as the support frame 130 has a transparent member placing surface such as a contact glass placing surface 132 on which the transparent member such as the contact glass 35 is placed, and a vertical surface such as a rail fixing surface 131 formed by being vertically bent from the transparent member placing surface, and the transparent member placing surface and the vertical surface are fixed to the rail members 120.

With such a configuration, as described in the embodiment, the rail member 120 can be reinforced by the L-shaped cross-sectional member L5 formed by the transparent member placing surface such as the contact glass placing surface 132, and the vertical surface such as the rail fixing surface 131. Consequently, it is possible to properly prevent the twist and the bending deformation of the housing 17.

[Aspect 6]

In Aspect 5, a recess (the first fixing members 131a in this embodiment) is provided at at least one portion of the vertical surface such as the rail fixing surface 131 of the support member such as the support frame 130.

With such a configuration, as described in the embodiment, it is possible to enhance the rigidity of the support member such as the support frame 130. As a result, it is possible to prevent the deformation of the support member, and properly reinforce the rail member 120. Consequently, it is possible to properly prevent the twist and the bending deformation of the housing 17.

[Aspect 7]

There is provided an image forming apparatus that includes an image reader that reads an image of a document surface, and an image forming member that forms an image on a recording medium on the basis of image information read by the image reader, wherein the image reading device such as the scanner 16 according to any of Aspect 1 to Aspect 6 is used as the image reader.

With such a configuration, it is possible to copy a good quality image.

[Aspect 8]

In Aspect 7, a support member such as a scanner supporting plate 150 that supports the image reader such as the scanner 16 supports the square pipe-shaped member S of the housing 17.

With such a configuration, as described in the embodiment, it is possible to prevent the deformation due to the weight of the scanner 16.

According to the above-described embodiments, the fixing member to be fixed to the bottom surface of the base member of the rail member formed by being vertically bent from the first vertical surface is a surface extending from one end of the rail member in the sub scanning direction to the other end thereof. Therefore, the rigidity of the rail member can increase over the whole area of the rail member in the sub scanning direction, thereby enhancing the rigidity of the rail member compared with the known configuration. Therefore, even when a force to cause twist deformation or bending deformation is applied to the housing, the reinforced rail member can prevent deformation of the housing. Consequently, the twist deformation, the bending deformation, or the like of the housing can be reduced preferably compared with the known configuration. Accordingly, the plate thickness of the base member of the housing according to the present embodiment is thinner than the plate thickness of the base member of the housing of the known configuration. As a result, the image reading device can enhance a further weight saving.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An image reading device comprising:
    an image pickup device;
    a plate-like transparent member on which a document is placed;
    a traveling body including a light source to emit light,
    a housing to accommodate the image pickup device and the traveling body therein,
    the housing including
        a base member including a rectangular bottom surface and a side surface vertically rising from the bottom surface and having an L-shaped member formed by the bottom surface and the side surface,
        a rail member including a rail surface parallel to the bottom surface on which at least the traveling body travels and a first vertical surface vertically falling from a side of one end of the rail surface and having an L-shaped member formed by the rail surface and the first vertical surface,
        the rail member fixed to the side surface of the base member and the bottom surface of the base member to form a square pipe shape by the L-shaped member of the base member and the L-shaped member of the rail member,
    wherein the rail member further includes a fixing part to be fixed to the bottom surface of the base member, wherein the fixing part is a surface bent horizontally from the first vertical surface and extends from one end of the rail member in the sub scanning direction to the other end.

2. The image reading device according to claim 1, wherein a plate thickness of the base member is thinner than a plate thickness of the rail member.

3. The image reading device according to claim 1, wherein the traveling body is a first traveling body having at least the light source; and further comprising a second traveling body having a reflector to travel on the rail surface, reflect light of the light source reflected from the document surface on the transparent member, and guide the light to the image pickup device, wherein the rail member includes a second vertical surface vertically rising from the other end of the rail surface, and a rail surface formed by being vertically bent from the second vertical surface for the first traveling body to travel.

4. The image reading device according to claim 1, wherein the housing includes a support member to support the transparent member, and wherein the support member is detachably fixed to the rail member.

5. The image reading device according to claim 4, wherein the support member has a transparent member placing surface on which the transparent member is placed, and a vertical surface formed by being vertically bent from the transparent member placing surface, and wherein the transparent member placing surface and the vertical surface are fixed to the rail member.

6. The image reading device according to claim 5, wherein a recess is provided at at least one portion of the vertical surface of the support member.

7. An image forming apparatus comprising:

the image reading device according to claim 1; and an image forming member that forms an image on a recording medium on the basis of image information read by the image reading device.

8. The image forming apparatus according to claim 7, further comprising a support member to support the image reading device, wherein the supporting member supports the square pipe-shaped member of the housing.

9. The image reading device according to claim 1, wherein the surface of the fixing part is in surface contact with an upper surface of the base member.

10. The image reading device according to claim 1, wherein the fixing part is bent at a right angle from the first vertical surface.

* * * * *